(12) United States Patent
Kalke

(10) Patent No.: US 7,957,728 B2
(45) Date of Patent: *Jun. 7, 2011

(54) GENERAL PURPOSE AUTOMATED ACTIVATION AND PROVISIONING TECHNOLOGIES

(75) Inventor: Catherine Kalke, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/466,287

(22) Filed: May 14, 2009

(65) Prior Publication Data

US 2010/0121736 A1 May 13, 2010

Related U.S. Application Data

(63) Continuation of application No. 10/700,301, filed on Oct. 31, 2003, now Pat. No. 7,548,746.

(60) Provisional application No. 60/423,224, filed on Nov. 1, 2002.

(51) Int. Cl.
*H04M 3/00* (2006.01)
(52) U.S. Cl. ...................... 455/418; 455/420; 455/435.2
(58) Field of Classification Search ........... 455/414.1–3, 455/411, 435, 1, 418–420, 435.1–2
See application file for complete search history.

(56) References Cited

U.S. PATENT DOCUMENTS

| | | | |
|---|---|---|---|
| 5,809,415 A | 9/1998 | Rossmann | |
| 5,812,953 A | 9/1998 | Griffith et al. | |
| 5,887,249 A | 3/1999 | Schmid | |
| 5,956,636 A | 9/1999 | Lipsit | |
| 6,181,787 B1 | 1/2001 | Malik | |
| 6,188,899 B1 | 2/2001 | Chatterjee et al. | |
| 6,208,853 B1 | 3/2001 | LoVasco et al. | |
| 6,282,421 B1 | 8/2001 | Chatterjee et al. | |
| 6,466,783 B2 | 10/2002 | Dahm et al. | |
| 6,470,179 B1 | 10/2002 | Chow et al. | |
| 6,490,445 B1 | 12/2002 | Holmes | |
| 6,546,243 B2 | 4/2003 | Tiedemann, Jr. et al. | |
| 6,549,770 B1 | 4/2003 | Marran | |
| 6,549,771 B2 | 4/2003 | Chang et al. | |
| 6,550,010 B1 | 4/2003 | Link, II et al. | |
| 6,560,604 B1 | 5/2003 | Fascenda | |
| 6,591,098 B1 | 7/2003 | Shieh et al. | |
| 6,618,593 B1 | 9/2003 | Drutman et al. | |
| 6,628,934 B2 | 9/2003 | Rosenburg et al. | |
| 6,643,504 B1 | 11/2003 | Chow et al. | |
| 6,836,651 B2 | 12/2004 | Segal et al. | |
| 7,133,695 B2 | 11/2006 | Beyda | |
| 7,221,939 B2 | 5/2007 | Ylitalo et al. | |
| 2001/0011028 A1 | 8/2001 | Wendelrup | |
| 2001/0027254 A1 | 10/2001 | Ogura | |

(Continued)

OTHER PUBLICATIONS

"3Com Delivers the Palm VII Organizer for Out-Of-The-Box Wireless Internet Access," 3 pages, http://www.palm.com/pr/palmviiregional.html, May 8, 2003.

(Continued)

*Primary Examiner* — CongVan Tran

(57) ABSTRACT

Automated activation and provisioning technologies can be applied in a variety of scenarios. For example, an automated activation and provisioning server can translate user desired features into associated provisioning directives. The directives can then be sent to elements of a wireless communications network support system. Activation and provisioning for a rich set of features can thus be achieved without manual intervention or reaction to the user's choices. Receipt of the user's choices can be accomplished in real time via a user interface of a mobile wireless device or a web-based user interface.

20 Claims, 37 Drawing Sheets

U.S. PATENT DOCUMENTS

| | | |
|---|---|---|
| 2001/0037254 A1 | 11/2001 | Glikman |
| 2002/0002503 A1 | 1/2002 | Matsuoka |
| 2002/0038369 A1 | 3/2002 | Sung |
| 2002/0102964 A1 | 8/2002 | Park |
| 2002/0194498 A1 | 12/2002 | Blight et al. |
| 2003/0013434 A1 | 1/2003 | Rosenberg et al. |
| 2004/0066920 A1 | 4/2004 | Vandermeijden |

OTHER PUBLICATIONS

"Activate Your PCS Phone," 1 page, http://activate.sprintpcs.com/explore/OLAHome.jsp, website visited on Sep. 30, 2002.

"Getting Started with the Palm VII Organizer," 14 pages, 3Com Corporation, Copyright 1998.

"Handbook for the Palm VII Handheld," pp. i-30, Palm, Inc., http://www.palmone.com/us/support/handbooks/handbookviix.pdf, Copyright 1998-2000.

"InPhonic and Palm Enter into Agreement to Simplify Activation Process for New Palm Tungsten W Handheld," http://biz.yahoo.com/bw/030225/255448_1.html, 2 pages, website visited on May 8, 2003.

"Member Review of Sprint Mobile Phone Service in Washington/Baltimore," 4 pages, http://www.epinions.com/elec-Comm-Mobileservice- All-Sprint_Washington_Baltimore/display_~reviews, website visited on Sep. 30, 2002.

"Sigma Systems Launches The Sigma Self-Service Manager" 3 pages, http://www.sigma-systems.com/html/news_04_23_02.htm, website visited on Jun. 25, 2002.

"Sprint PCS Wireless Web Digital Link," http://www.visorcentral.com/content/Stories/13462.htm, 2 pages, website visited on Sep. 30, 2002.

"Success Story: Palm Computing a 3Com Company," 2 pages, Portal Software, Inc., http://www.asiatele.com/internet/palm.pdf, 1999.

"Welcome to TELUS Mobility's Web Activation Service," 2 pages, http://www.telusmobility.com/bc/webactivation/index.shtml, website visited on Oct. 31, 2002.

Barse, "Palm VII Launch," 4 pages, http://www.mobitex.org/palmvii/launch.html, website visited on Sep. 24, 2002.

Gohring, "Palm Computing Loses the Wires: BellSouth Signs on for Service," Telephony, http://telephonyonline.com/ microsites/magazinearticle.asp?mode=print&magazinearticleid=25003&releaseid=&srid=11357&magazineid=7&siteid=3, 2 pages, Dec. 14, 1998.

Menezes, "Activation Process Becomes Critical," 2 pages, http://www.wirelessweek.com/index.asp?layout=articlePrint&articleID=CA270767, Jan. 15, 2003.

Reeves, "Self-Serve Service," Wireless Review, http://wirelessreview.com/microsites/magazinearticle.asp?mode= print&magazinearticleid=26 604&releaseid=&srid=11393&magazineid=9&siteid=3, 5 pages, Aug. 1, 1998.

Robinson, "Innovation Sets the Tone for Wireless Services—Traditional Telcos Forced to Play Catch-Up," InternetWeek, n718 pS22(1), 4 pages, Jun. 8, 1998.

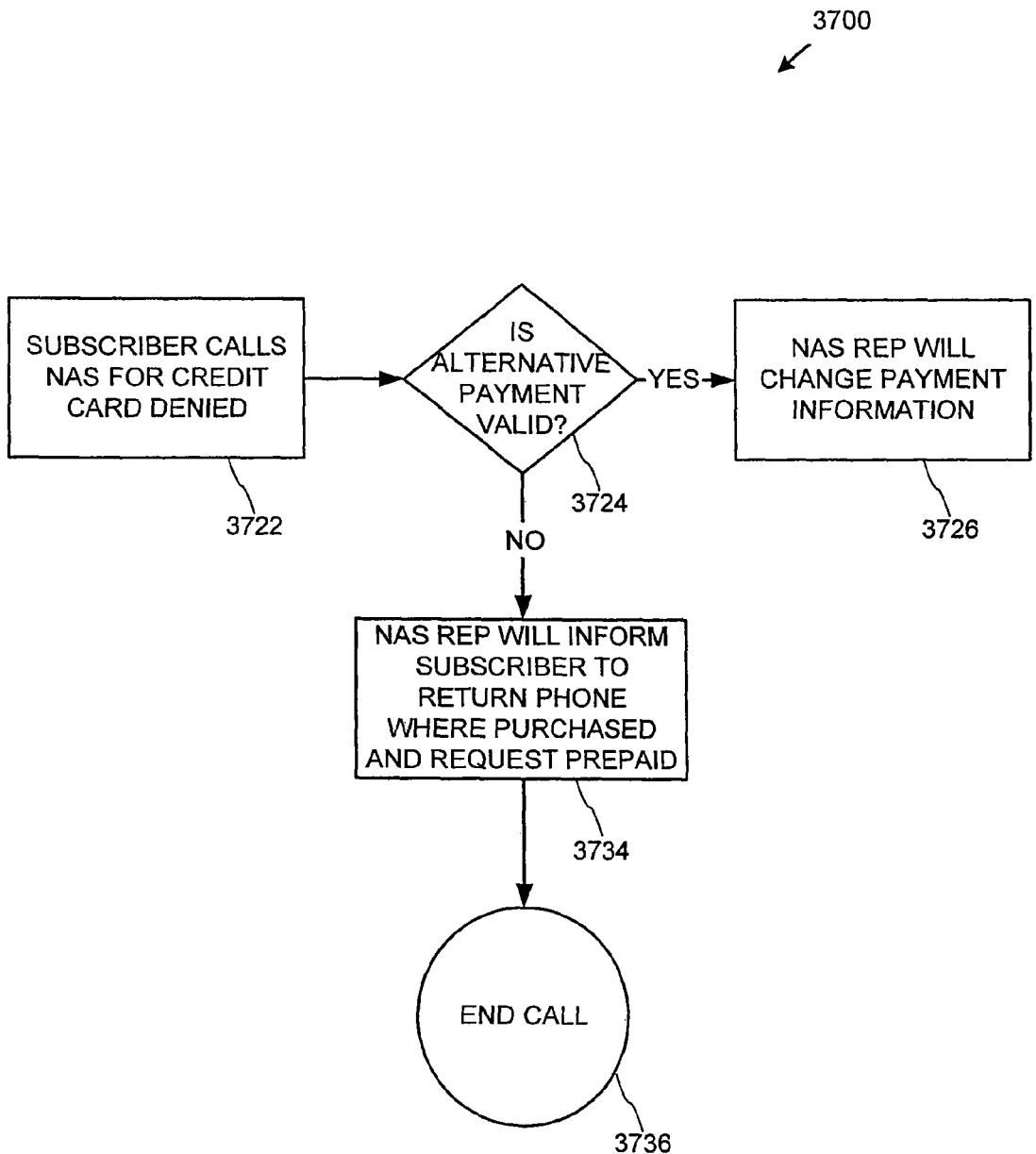

US 7,957,728 B2

GENERAL PURPOSE AUTOMATED ACTIVATION AND PROVISIONING TECHNOLOGIES

CROSS REFERENCE TO RELATED APPLICATIONS

This application claims the benefit of U.S. Provisional Patent Application No. 60/423,224, by Kalke, filed Nov. 1, 2002, entitled, "SELF-ACTIVATION VIA WIRED WEB AND DEVICE," which is hereby incorporated herein by reference.

TECHNICAL FIELD

The technical field relates generally to activation and provisioning for mobile wireless communications devices, such as a mobile telephone or other devices supporting wireless communications.

BACKGROUND

A variety of techniques have been applied in the field of mobile wireless device activation. For example, U.S. Pat. No. 6,188,899 to Chatterjee et al., entitled "SYSTEM AND METHOD FOR AUTOMATIC REGISTRATION NOTIFICATION FOR OVER-THE-AIR ACTIVATION," describes technologies for over-the-air activation of mobile devices. While such approaches are useful, they can suffer from various drawbacks.

In particular, while automatic activation functionality is achieved, it is limited in some respects. With the advent of technological innovation, subscribers are now presented with a wide variety of services and can select a set of services to personalize their mobile wireless experience according to their lifestyle or other factors. As functionality of mobile devices grows more complex, conventional activation technologies still often require manual intervention (e.g., by a customer service representative). Of particular difficulty is the provisioning associated with activation. For example, due to the growing variety of functionality available via mobile devices, the associated provisioning processes have become diverse and more complex. A typical approach is to manually intervene to achieve provisioning. Or, provisioning may be delayed so that a subscriber cannot use desired services until well after activation is completed. Therefore, new technologies in the field of automatic activation and provisioning are needed.

SUMMARY

Various technologies relating to automatic activation, provisioning, or both can be achieved by a general purpose automatic activation and provisioning server. Directives sent to the server can be implemented to achieve activation, provisioning, or both.

For example, an automatic activation and provisioning server can be accessed by both a wireless device through a wireless network or any web browser system through an IP network (e.g., the Internet). The same information can be collected via either technique via similar user interfaces.

Activation or provisioning requests can be translated into appropriate directives and sent to the appropriate provisioning elements. For example, if a subscriber chooses services (e.g., enhanced features), the automatic activation and provisioning server can receive an indication of the services, translate them into appropriate directives, and send the directives to the appropriate elements.

The availability of such a system can open up many possibilities for automatic activation and provisioning. For example, any number of scenarios involving retail stores or online purchasing can be supported.

In addition, because provisioning can be automated and started immediately upon completion of activation, desired services can be provided almost immediately after completion of activation, resulting in a more positive subscriber experience.

The foregoing and other features and advantages will become more apparent from the following detailed description of disclosed embodiments, which proceeds with reference to the accompanying drawings.

BRIEF DESCRIPTION OF THE FIGURES

FIG. 37 is a flowchart showing an exemplary method for processing activation service support for a subscriber with an credit denial.

DETAILED DESCRIPTION OF EXEMPLARY EMBODIMENTS

Example 1

Exemplary Overview

Figure 1:
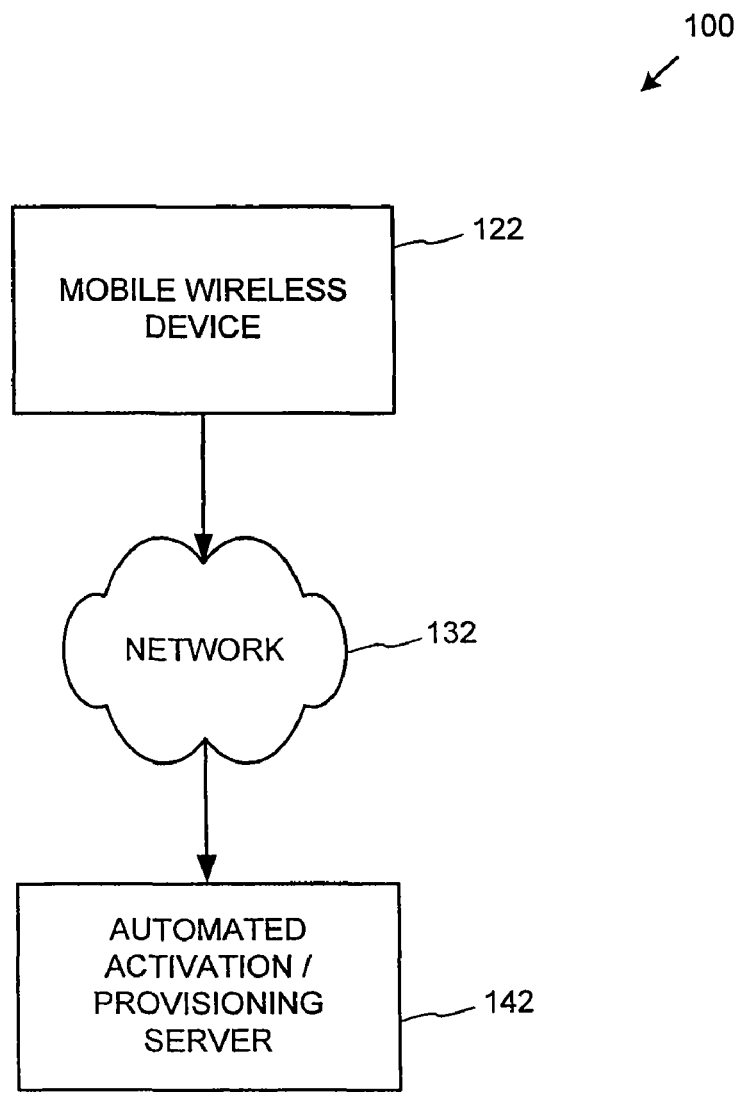
FIG. 1 is a block diagram showing an exemplary system supporting an automated activation and provisioning server accessible via a mobile wireless device.

The technologies described herein can be applied to a variety of scenarios for achieving activation and provisioning for mobile wireless devices. For example, a subscriber can buy a mobile wireless device off the shelf; take the device home and achieve activation over-the-air while selecting from a rich variety of services. Automated provisioning for the subscriber-selected services can be immediately initiated and achieved almost immediately after completion of activation.

Example 2

Exemplary Mobile Wireless Devices

In any of the examples described herein, a mobile wireless device can be a mobile wireless telephone. However, a mobile wireless device can also take the form of another device having mobile wireless communication functionality. For example, portable computers, handheld computers, personal digital assistants, and the like can be used in conjunction with the technologies. In addition, a SIM card can be considered as a mobile wireless device in some scenarios (e.g., SIM cards are designed to be used in conjunction with a mobile wireless device but can typically be moved from device to device).

For those techniques employing web browser functionality, different levels of presentation can be achieved, ranging from a full-featured web browser to a scaled-down version of web browsing with a more limited presentation (e.g., on a smaller display).

Example 3

Exemplary Provisioning Functionality

Provisioning can include any of the processing performed to provide wireless network services. Any of the examples described herein can be used to support provisioning for a wide variety of mobile wireless services. As the number of services provided in conjunction with mobile wireless service increases, provisioning complexity can be expected to increase as well.

As technology progresses, subscribers avail themselves of enhanced services (e.g., those beyond simple telephone calls). Subscribers can personalize their mobile wireless experience by selecting those services appropriate for their lifestyle or other factors. For example, the services shown in Table 1 can be provided.

TABLE 1

Exemplary Mobile Wireless Services

| Name | Description |
| --- | --- |
| Ring tone selection services | A subscriber can select any of a variety of ring tones (e.g., musical tunes, sound effects, and the like) to add to the mobile wireless device; if desired, ring tones can be personalized by caller (e.g., calls from different callers result in different ring tones) |
| Graphics services | A subscriber can choose from graphics to be displayed on the mobile wireless device (e.g., as a background image) |
| Transactional electronic payment system for premium services | A subscriber can enroll in a transactional electronic payment system (e.g., digital cash) for premium services for the mobile wireless device |
| Selection of premium services via transaction electronic payment system | A subscriber can choose premium services for the mobile wireless device that are paid for via the transactional electronic payment system |
| Subscribing to email access services | A subscriber can subscribe to a service which allows a subscriber to access, read, and reply to emails in selected email accounts via the mobile wireless device |
| Image services | A subscriber can enroll in a service which allows digital photographs captured by the mobile wireless device to be shared with others (e.g., in an email) |
| Game services | A subscriber can choose to subscribe to a game service for access to games (e.g., Java applications) on their mobile wireless device |
| Text messaging services | A subscriber can add text messaging services for the mobile wireless device |
| Unified messaging services | A subscriber can add unified messaging services, which allows management of incoming emails and voicemails in a single mailbox via the mobile wireless device. |
| Equipment insurance purchase | A subscriber can purchase insurance for equipment (e.g., the mobile wireless device) |
| Mobile-to-Mobile minutes | A subscriber can enroll in a mobile-to-mobile service plan for the mobile wireless device |
| Voice activated dialing | A subscriber can subscribe to a voice activated dialing service, which allows the mobile wireless device to recognize spoken (e.g., pre-programmed) commands (e.g., for dialing a number without manual dialing) |
| Purchasing accessories | A subscriber can purchase accessories (e.g., for the mobile wireless device) |
| Geographic location services | A subscriber can allow others (e.g., colleagues or friends) with mobile wireless devices to locate the geographic location of the subscriber's mobile wireless device |
| Instant messaging services | A subscriber can send and receive instant messages via the mobile wireless device |

Upon selection of the service, to provide the service, provisioning is completed in the mobile communications network support system. For example, in the case of selection of ring tones, the data relating to the ring tone can be sent to the mobile wireless device. In the case of text messaging, appropriate configuration changes can be made to the network, and the billing systems can be updated to indicate that the subscriber is to be billed for the text messaging services, if appropriate.

Example 4

Exemplary Automated Provisioning

Because subscriber selections can be accepted in real time, and the provisioning can be performed in an automated fashion (e.g., by the automated activation and provisioning server), the system can complete subscriber-directed feature selection, activation, and automated provisioning in a matter of minutes (e.g., 5-15 or 10-15 minutes), rather than having to wait for batch processing or availability of a customer service representative. For example, activation can be achieved almost immediately (e.g., 30 seconds).

In this way, the subscriber can drive the automated provisioning without assistance from other persons. Such an approach can significantly reduce support costs and provide a more positive experience for the subscriber.

Example 5

Exemplary Unactivated Mobile Wireless Devices

In any of the examples, communications can be established with an unactivated mobile wireless device. An unactivated mobile wireless device typically can make some calls (e.g., emergency or 911 calls), but is not recognized by the wireless system as associated with a paying subscriber.

Activation includes the process by which the mobile wireless device is added to the list of mobile wireless devices recognized by the system as permitted to make use of non-emergency services, including voice telephone calls. On a technical level, various provisioning takes place to activate a mobile wireless device, including assignment of a MIN (e.g., telephone number) and opening an account (e.g., for billing purposes).

However, in the examples herein, an unactivated device can communicate to achieve activation and provisioning for subscriber-selected services.

Example 6

Exemplary System for Achieving Automated Activation and Provisioning

FIG. 1 shows an exemplary system 100 for supporting an automated activation and provisioning server 142 accessible via a mobile wireless device 122.

In the example, the mobile wireless device 122 can be unactivated. The mobile wireless device 132 is operable to receive subscriber input via a user interface and can achieve bi-directional communication (e.g., via wireless technology) via the wireless network 132 with the automated activation and provisioning server 142. The server 142 is operable to accept subscriber input to achieve activation and an indication of subscriber choices indicating subscriber-desired services (e.g., related to providing mobile wireless communication services). The server 142 can then orchestrate appropriate actions by which the mobile wireless device 122 is activated and provisioning is achieved for the subscriber-desired services. In some cases, the server 142 can be divided into separate physical machines (e.g., to achieve scalability or to separate functionality for accepting subscriber input from the functionality for orchestrating appropriate actions in response to the subscriber input).

Example 7

Exemplary System for Achieving Automated Activation and Provisioning

Figure 2:
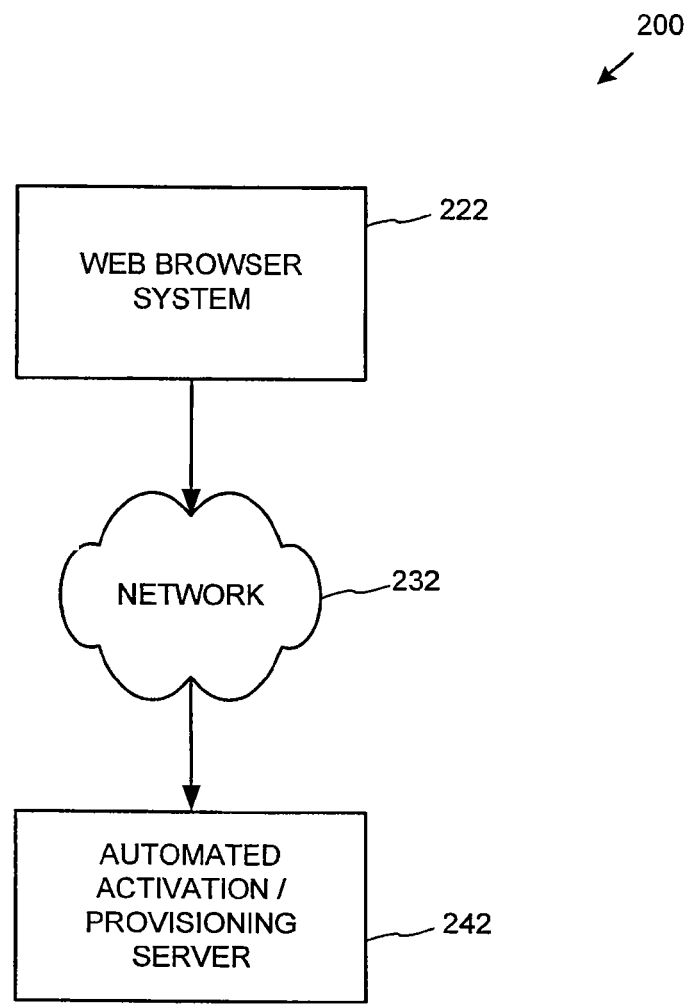
FIG. 2 is a block diagram showing an exemplary system supporting an automated activation and provisioning server accessible via a web browser system.

FIG. 2 shows an exemplary system 200 for supporting an automated activation and provisioning server accessible via a web browser system 222.

In the example, the web browser system 222 is operable to receive input via a user interface and can achieve bi-directional communication (e.g., via the HTTP protocol) via the wired web network 232 with the automated activation and provisioning server 242. The server 242 is operable to accept subscriber input to achieve activation and an indication of subscriber choices indicating subscriber-desired services (e.g., related to providing wireless communication services). The server 242 can then orchestrate appropriate actions by which a mobile wireless device (not shown) is activated and provisioning is achieved for the subscriber-desired services. In some cases, the server 242 can be divided into separate physical machines (e.g., to achieve scalability or to separate functionality for accepting subscriber input from the functionality for orchestrating appropriate actions in response to the subscriber input).

Example 8

Exemplary System for Achieving Automated Activation and Provisioning

Figure 3:
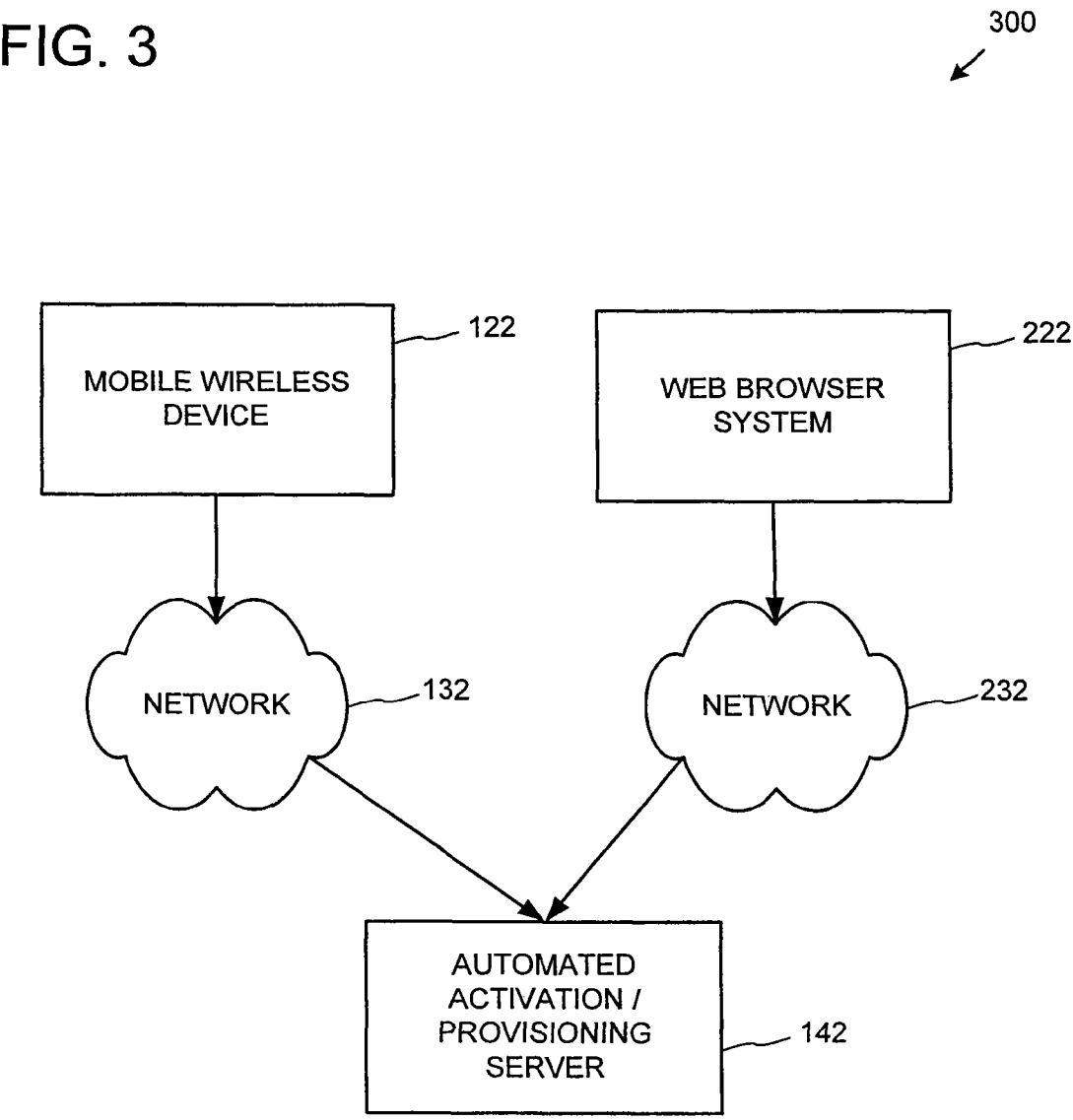
FIG. 3 is a block diagram showing an exemplary system supporting an automated activation and provisioning server accessible via both a mobile wireless device and a web browser system.

FIG. 3 shows an exemplary system (e.g., an extension to the system 100) for supporting an automated activation and provisioning server 142 accessible via both a mobile wireless device 122 and a web browser system 222. In the example, the server 142 and associated functionality can be shared by both mobile wireless device 122 and the web browser system 222. Similar user interfaces can be presented in both cases. In this way, a consistent subscriber experience can be provided across both the wireless device 122 and the web browser system 222. Other advantages can grow out of such an arrangement, such as avoiding having to maintain two systems in parallel and maintaining consistency throughout such systems.

Example 9

Exemplary General Purpose Nature of Server

The automated activation and provisioning server (e.g., server 142) is sometimes called a "general purpose" automated activation and provisioning server because it can be programmed to handle any of a wide variety of scenarios. For example, as new services are developed, the server can be easily re-configured to handle provisioning for the new service (e.g., by collecting any additional information if necessary and generating appropriate provisioning directives). Such an approach can simplify administration and maintenance for the services because provisioning for many disparate services can be handled centrally.

Example 10

Exemplary Method for Achieving Automated Activation and Provisioning

Figure 4:
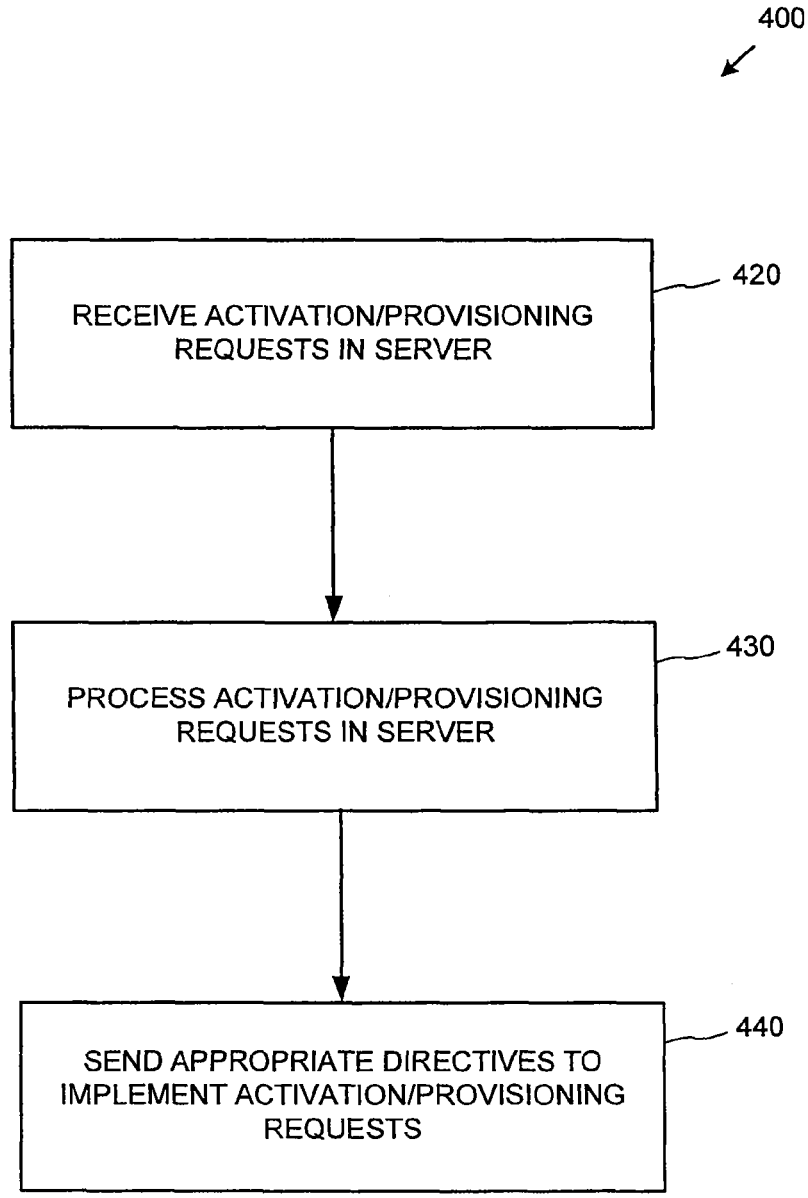
FIG. 4 is a flowchart showing an exemplary method for achieving automated activation or provisioning via requests received at a server.

FIG. 4 shows an exemplary method 400 for achieving automated activation or provisioning via requests received at a server (e.g., the automated activation and provisioning server 142 of FIG. 3).

At 420, activation or provisioning (or some combination thereof) requests are received in the server. For example, a request can be received in real-time responsive to indication by a subscriber of a desired service.

At 430, the requests are processed in the server. For example, various determinations can be made regarding what directives are to be sent to fulfill subscriber requests for services and to where such directives are to be sent.

At 440, appropriate directives are sent to implement the activation and provisioning request. For example, provisioning directives can be sent to elements of the mobile wireless communication network support system to implement the directives responsive to indication by a subscriber of a desired service.

Example 11

Exemplary Provisioning Elements

Figure 5:
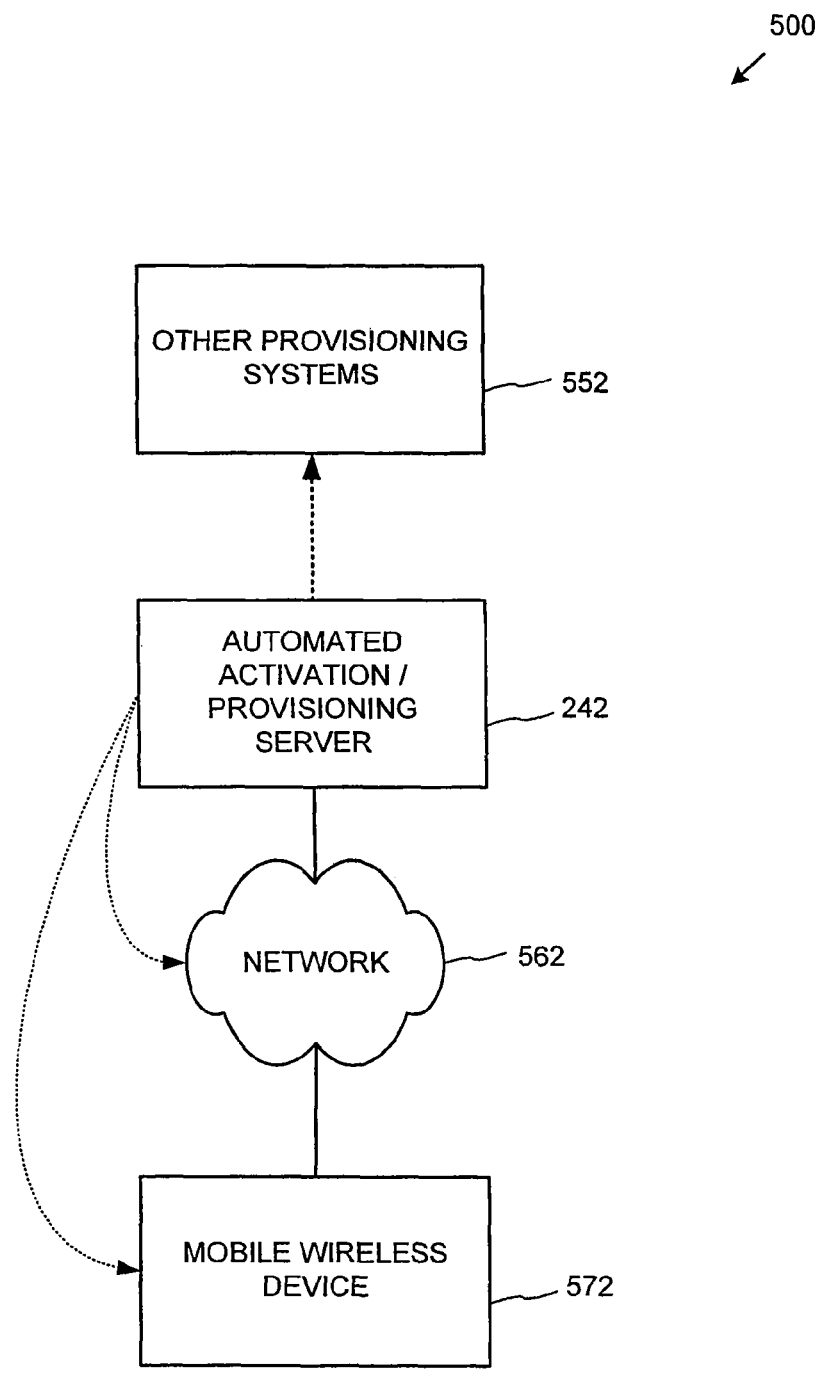
FIG. 5 is a block diagram showing an exemplary system by which an automated activation and provisioning server can send provisioning directives.

FIG. 5 shows an exemplary system 500 by which an automated activation and provisioning server 242 can send provisioning directives. Directives can be sent to any element that supports the mobile wireless communication network 562.

The server 242 can send provisioning directives to the mobile wireless device 572, the network 562 (e.g., any of the network nodes), or other provisioning systems 552. The other provisioning systems 552 can include any of a wide variety of systems for supporting the network 562 (e.g., internal billing systems, merchandise shipping systems, transactional e-commerce systems, credit check servers, online customer care systems, and the like).

Because the automated activation and provisioning server 242 is behind the network 562 from the perspective of the mobile wireless device 572, it is sometimes called the "back end." Accordingly, the techniques described herein are sometimes said to be used for back end automated provisioning (e.g., provisioning of those systems, such as billing systems, which are behind the network 562 from the perspective of the mobile wireless device 572).

Example 12

Exemplary System with Automated Activation and Provisioning Server

Figure 6:
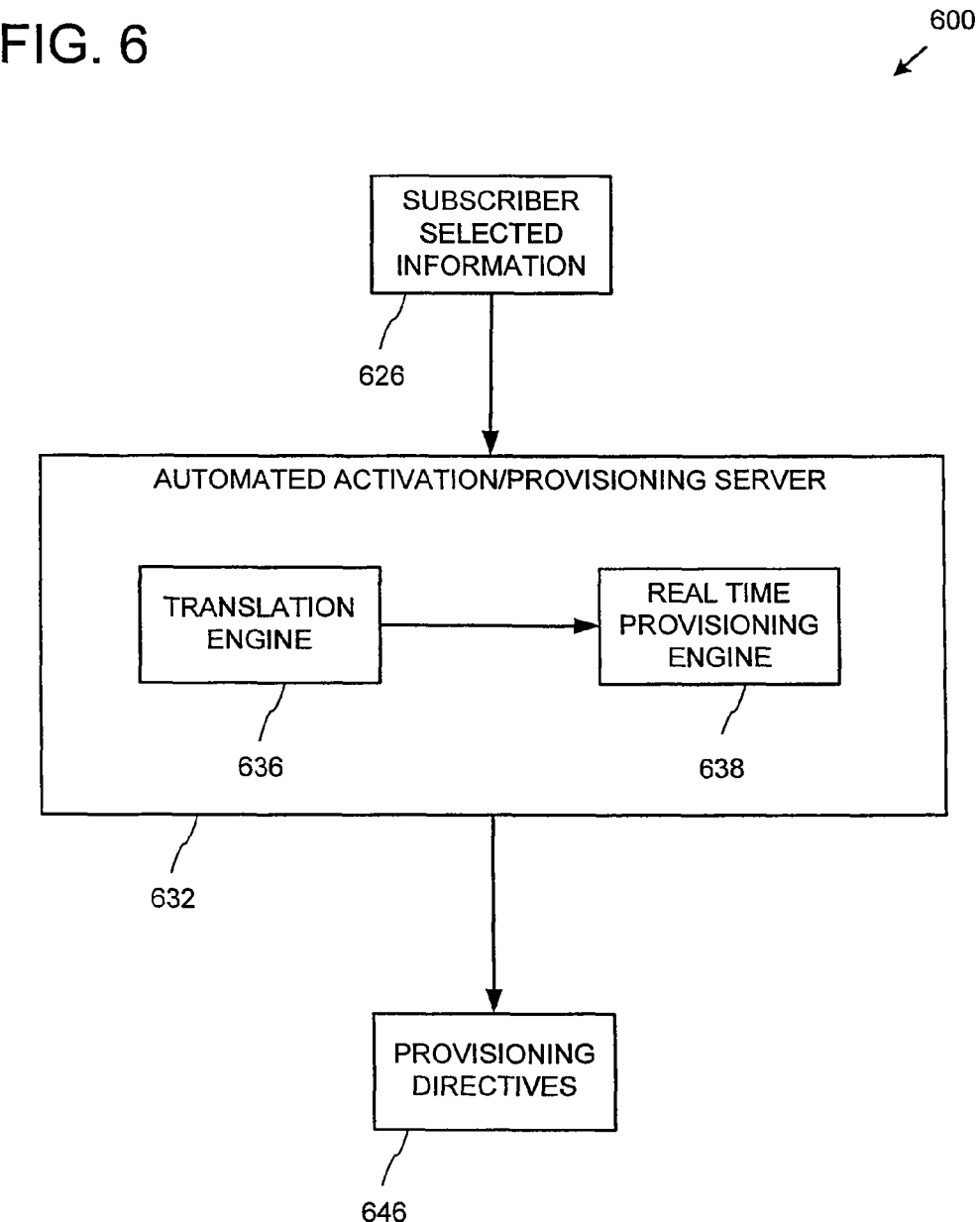
FIG. 6 is a block diagram showing an exemplary system including an automated activation and provisioning server that can receive subscriber-selected information and send directives to provisioning elements.

FIG. 6 shows an exemplary system 600 including an automated activation and provisioning server 632 that can receive subscriber-selected information and send directives to provisioning elements 646 (e.g., any of the provisioning elements shown in FIG. 5).

The system 600 can receive subscriber-selected information 626, which is processed by the automated activation and provisioning server 632. Responsive to receipt of the subscriber-selected information 626, the server 632 sends appropriate provisioning directives 646 to provisioning elements.

The automated activation and provisioning server 632 can include a translation engine 636 and a real time provisioning engine 638. The translation engine 636 can include logic for translating subscriber-selected information, such as desired services and the parameters associated with the desired services, into appropriate directives, which are sent to the real time provisioning engine 638, which orchestrates delivery of the directive 646 to the appropriate provisioning elements.

As new services are added or services change, the translation engine 636 can be updated to reflect the new services. As new provisioning elements are added or changed, the real time provisioning engine 638 can be updated to reflect the new provisioning elements. In this way, control over provisioning can be centralized and more easily administered, rather than dispersed throughout the network.

Example 13

Exemplary Method for Processing Subscriber-Provided Information

Figure 7:
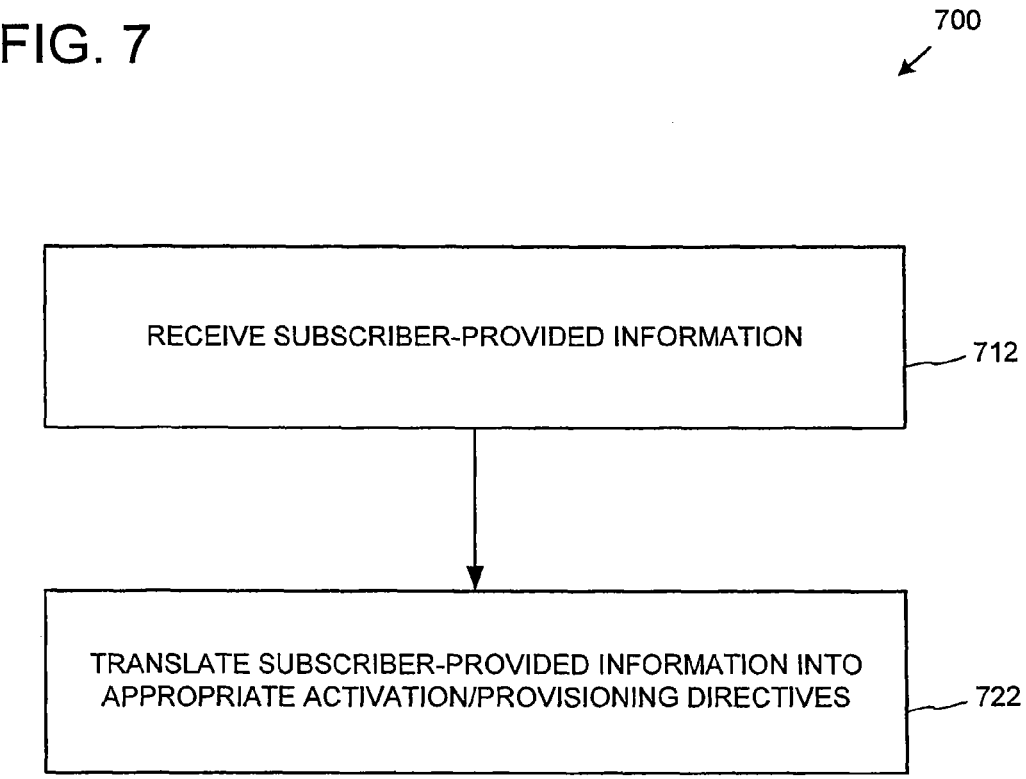
FIG. 7 is a flowchart showing an exemplary method for processing subscriber-provided information.

FIG. 7 shows an exemplary method 700 for processing subscriber-provided information, which can be performed, for example, by the translation engine 636 or some other part of the server 632.

At 712, subscriber-provided information can be received. For example, the customer information can indicate subscriber-selected services selected in real time via a user interface.

At 722, the customer-provided information is translated into appropriate activation or provisioning (or some combination thereof) directives. In some cases, a request for a single feature may result in plural directives.

Example 14

Figure 8:
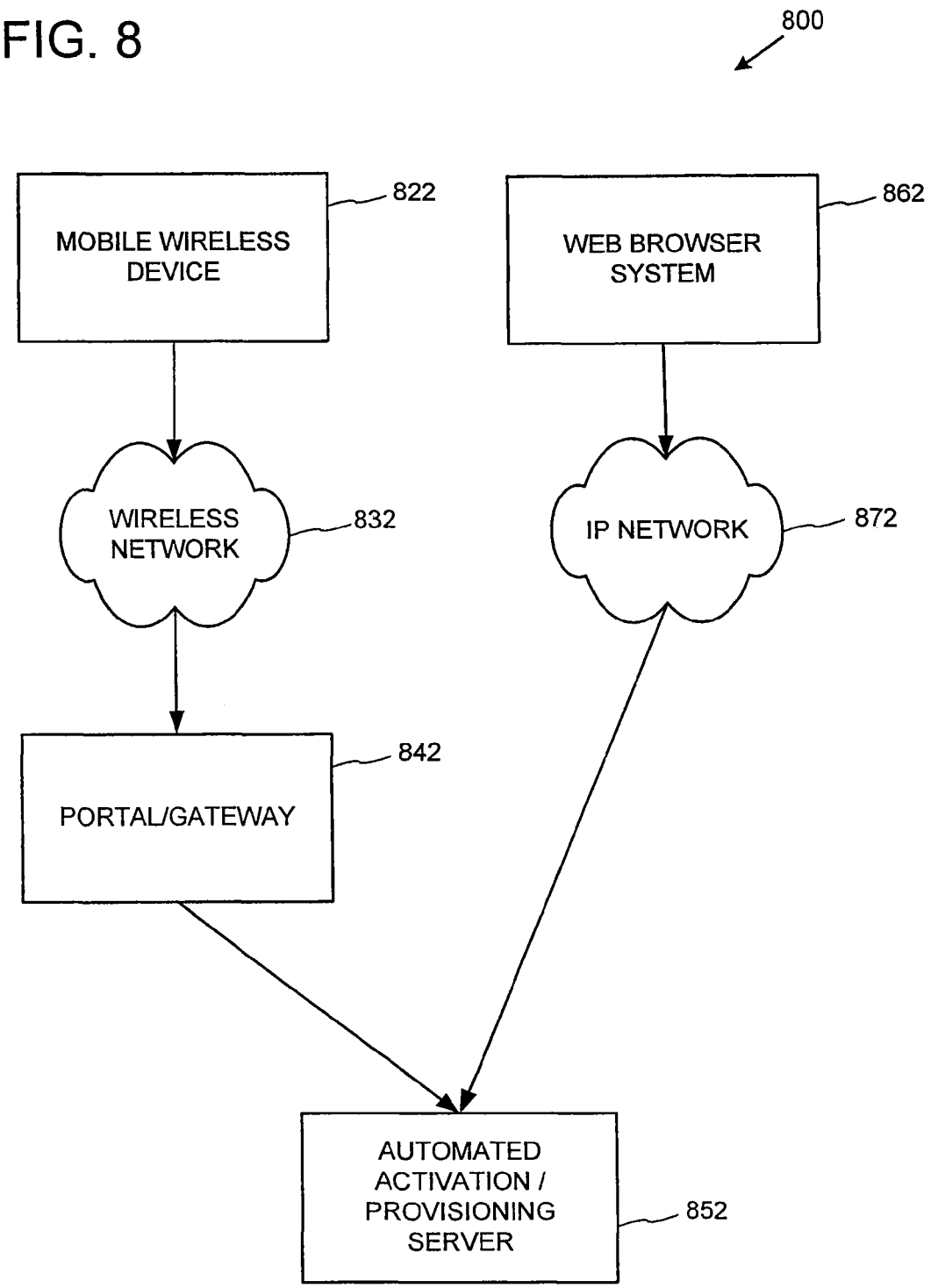
FIG. 8 is a block diagram showing an exemplary system in which an automated activation and provisioning server is accessible by both a mobile wireless device and a web browser system.

Exemplary System with Automated Activation and Provisioning Server Accessible by Wireless Device and Web Browser FIG. 8 shows an exemplary system 800 in which an automated activation and provisioning server 852 is accessible by both a mobile wireless device 822 (e.g., an unactivated mobile wireless device) and a web browser system 862. In the example, a portal/gateway 842 provides a link between the wireless network 832 and the server 852; the web browser system 862 can access the server 852 via an IP network 872 (e.g., the Internet).

In some scenarios, it may be desirable to allow the wireless mobile device 822 to conduct web browsing activity over the IP network 872, even if it is not activated. In such a case, a firewall can block traffic that is not related to activation and provisioning (e.g., by using a special IP address or range of IP addresses for activation and provisioning functionality).

Example 15

Exemplary Method for Connecting a Mobile Wireless Device to a Server

Figure 9:
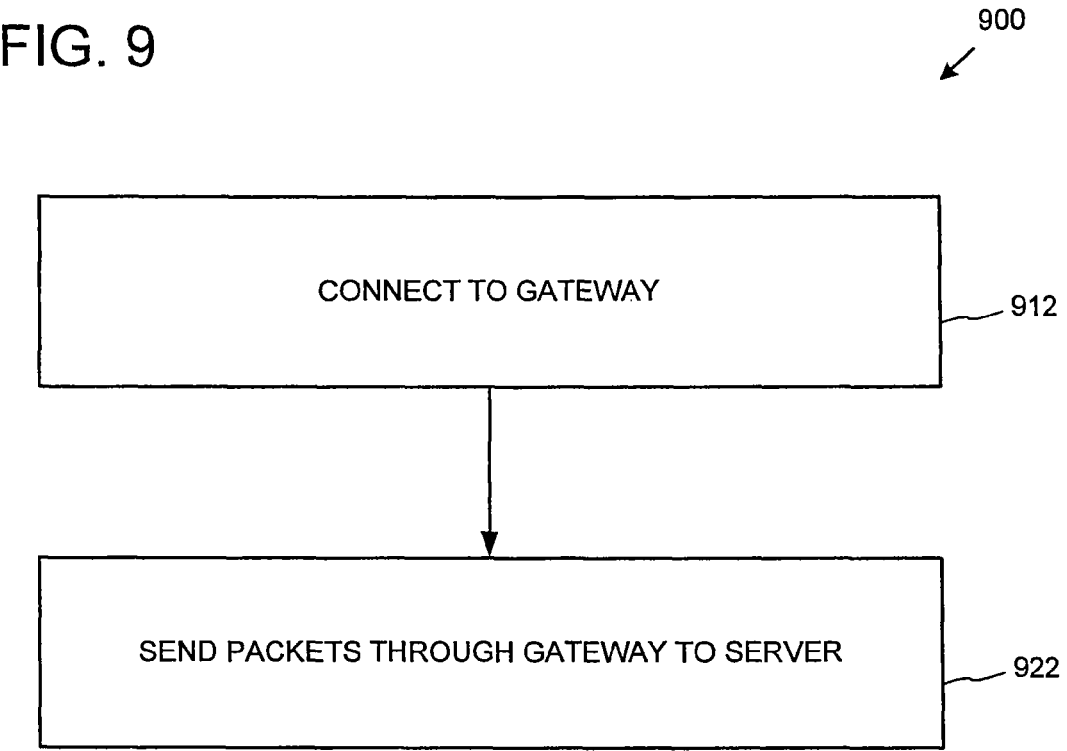
FIG. 9 is a flowchart showing an exemplary method for connecting a mobile wireless device to a server.

FIG. 9 shows an exemplary method 900 for connecting a mobile wireless device (e.g., the mobile wireless device 822, which can be unactivated to a server (e.g., the server 852).

At 912, the mobile wireless device connects to a gateway. At 922, packets are sent through the gateway to the server. In this way, the mobile wireless device can communicate with the server using a common protocol (e.g., over an IP network) similarly and in concert with web browsing systems.

Example 16

Exemplary Signaling for Mobile Wireless Device-WAP Gateway Communication

Figure 10:
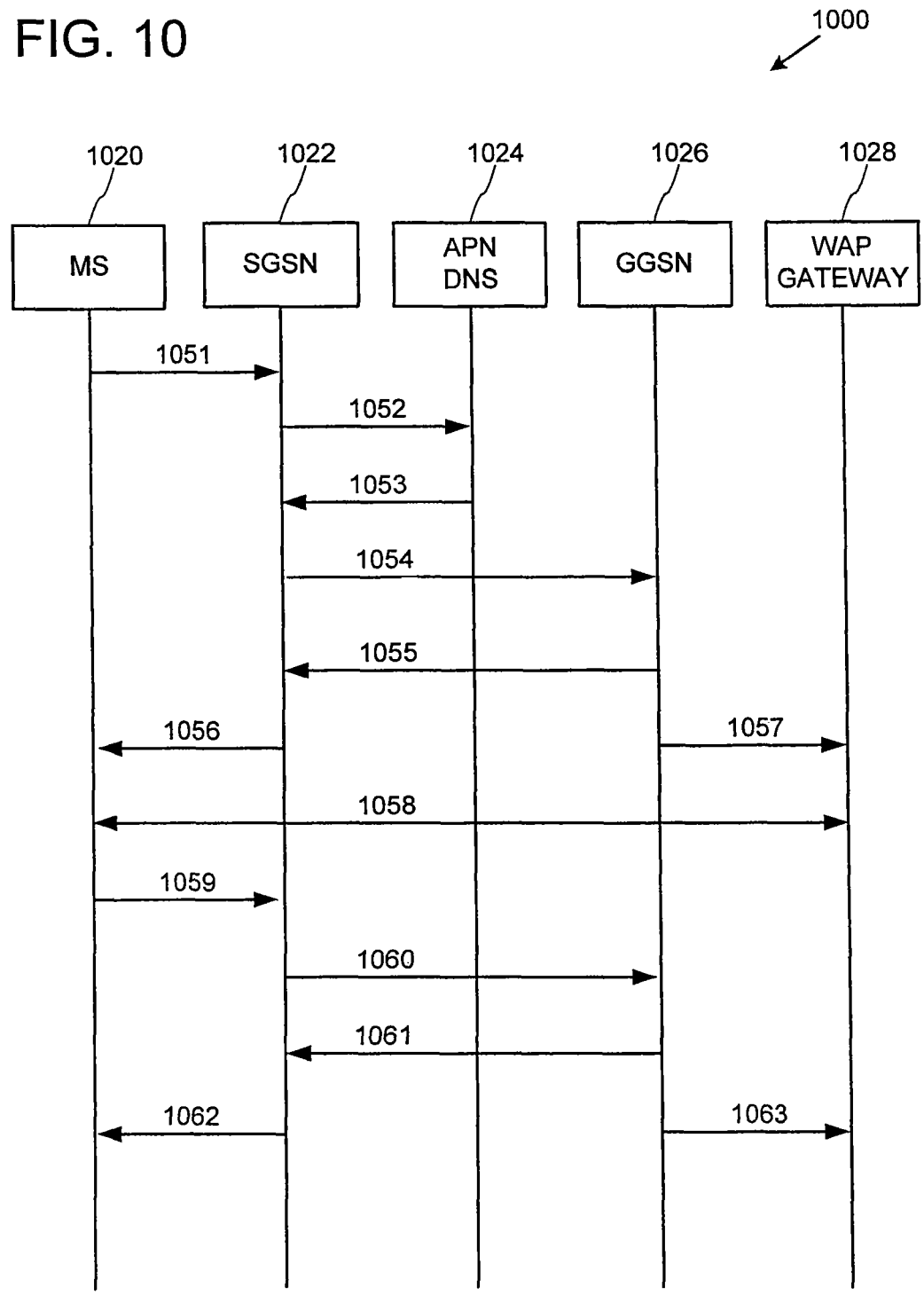
FIG. 10 is a signaling diagram showing exemplary signaling for achieving communications between a mobile wireless device and a WAP gateway.

FIG. 10 shows exemplary signaling 1000 for connecting achieving communications between a mobile wireless device ("mobile station") 1020 and a WAP gateway 1028.

At 1051, the mobile station 1020 sends an Activate PDP Context Request (NSAPI, TI, PDP Type, PDP Address, Self Activation APN, QoS Requested, RDP Configuration Options) to the SGSN 1022.

At 1052, the SGSN 1022 sends a DNS query on Self Activation APN 1024.

At 1053, DNS 1024 responds with a list of IP addresses for GGSN's that handle the specified APN 1024.

At 1054, the SGSN sends a Create PDP Context Request (PDP Type, PDP Address, Access Point Name, QoS Negotiated, TID, MSISDN, Selection Mode, PDP Configuration Options) message to the selected GGSN 1026.

At 1055, the GGSN returns a Create PDP Context Response (TID, PDP Address=IP, Reordering Required, PDP Configuration Options, QoS Negotiated, Charging ID, Cause) message to the SGSN 1022.

1056 and 1057 can be performed asynchronously. At 1056, the SGSN 1022 returns an Activate PDP Context Accept (PDP Type, PDP Address, TI, QoS Negotiated, Radio Priority, PDP Configuration Options) message to the Mobile Station 1020.

At 1057, the GGSN 1026 sends RADIUS accounting start request (NAS-IP-Address=GGSN IP, Calling-Station-Id=directory number, Framed—IP-Address, Called-Station-ID=APN, timestamp) to the WAP gateway 1028.

At 1058, WAP IP packets are relayed between the Mobile Station 1020 and the WAP gateway 1028. The connection can operate without regard to the contents to the packets. In other words, the connection is transparent to the Mobile Station 1020 and whatever items (e.g., an automated activation and provisioning server) might connect to the WAP Gateway 1028.

At 1059, the Mobile Station 100 terminate the session (the session may also be terminated by the network if the Mobile Station 1020 is not reachable). The Mobile Station 1020 sends a Deactivate PDP Context Request (TI).

At 1060, the SGSN 1022 sends a Delete PDP Context Request (TID) to the GGSN 1026.

At 1061, the GGSN sends a Delete PDP Context Response (TID) to the GGSN 1026.

1062 and 1063 can be performed asynchronously. At 1062, the SGSN 1022 sends a Deactivate PDP Context Accept (TI) to the Mobile. Station 1020.

At 1063, the GGSN 1026 sends RADIUS accounting stop request (NAS-IP-Address=GGSN IP, Calling-Station-ID=directory number, Framed—IP-Address, Called-Station-Id=APN, timestamp) to the WP gateway 1028.

A similar arrangement can be used to achieve communication between other systems (e.g., PocketNet systems or systems based on the Microsoft® Windows® operating system), using an optimization complex ("OC") instead of the WAP gateway 1028. In such an example, the following can be done:

At 1057, the GGSN 1026 sends RADIUS accounting start request (NAS-IP-Address=GGSN IP, Calling-Station-Id=directory number, Framed—IP-Address, Called-Station-Id=APN, timestamp) to the Optimization Complex.

At 1058, WAP IP packets are relayed between the Mobile Station 1020 and the Optimization Complex.

At 1063, the GGSN 1026 sends RADIUS accounting stop request (NAS-IP-Address=GGSN IP, Calling-Station-Id=directory number, Framed—IP-Address, Called-Station-Id=APN, timestamp) to the optimization complex.

Example 17

Figure 11:
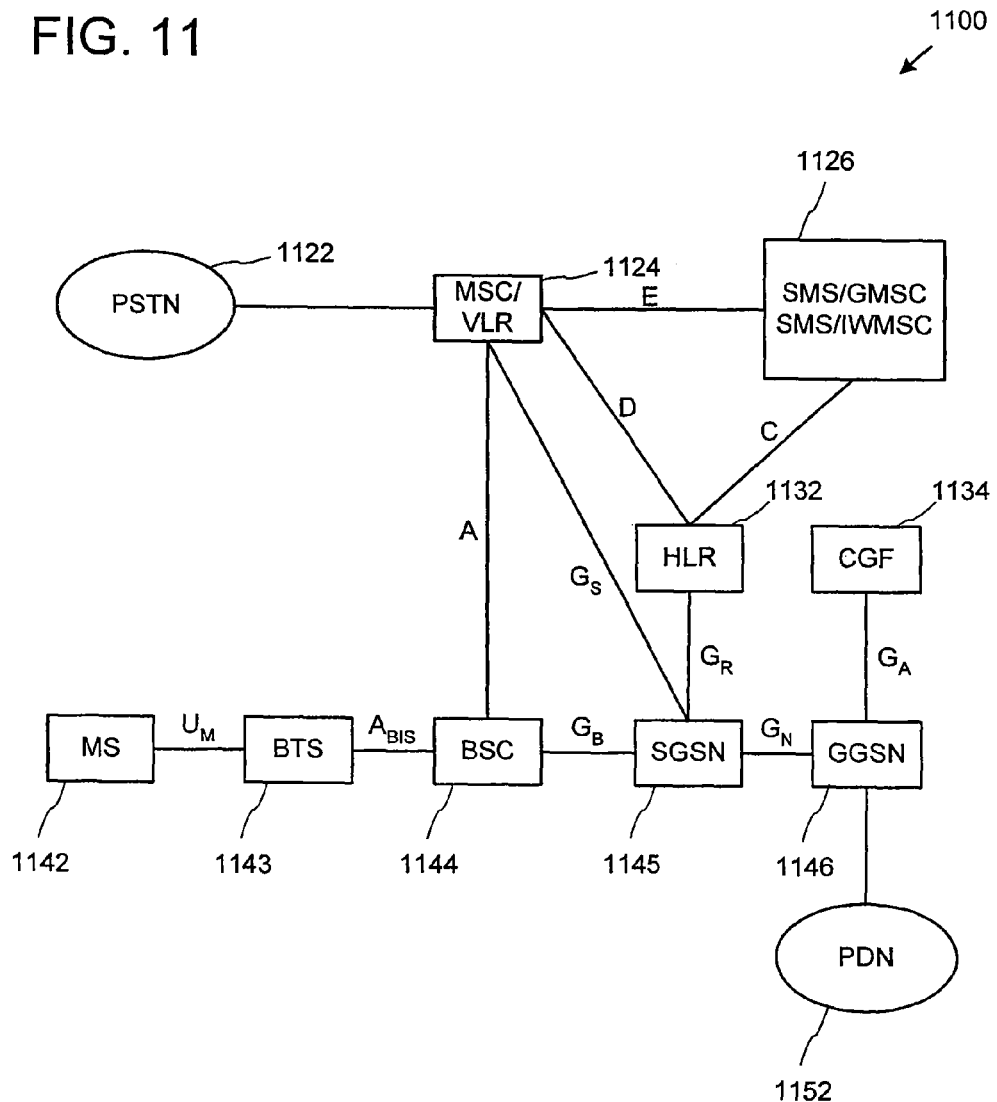
FIG. 11 is a block diagram showing an exemplary wireless network configured to accommodate connection to an automated activation and provisioning server.

Exemplary Wireless Network Accommodating Connection with Automated Activation and Provisioning Server FIG. 11 shows an exemplary wireless network 1100 configured to accommodate connection to an automated activation and provisioning server. The exemplary network is constructed according to a GSM/GPRS/EDGE/UMTS architecture and includes the elements 1122, 1124, 1126, 1132, 1134, 1142, 1143, 1144, 1145, 1146, and 1152.

The architecture of the network 1100 need not be altered from a standard architecture for a GSM/GPRS/EDGE/UMTS system. However, as described below, some of the elements can be configured to accommodate automated activation and provisioning.

Figure 12:
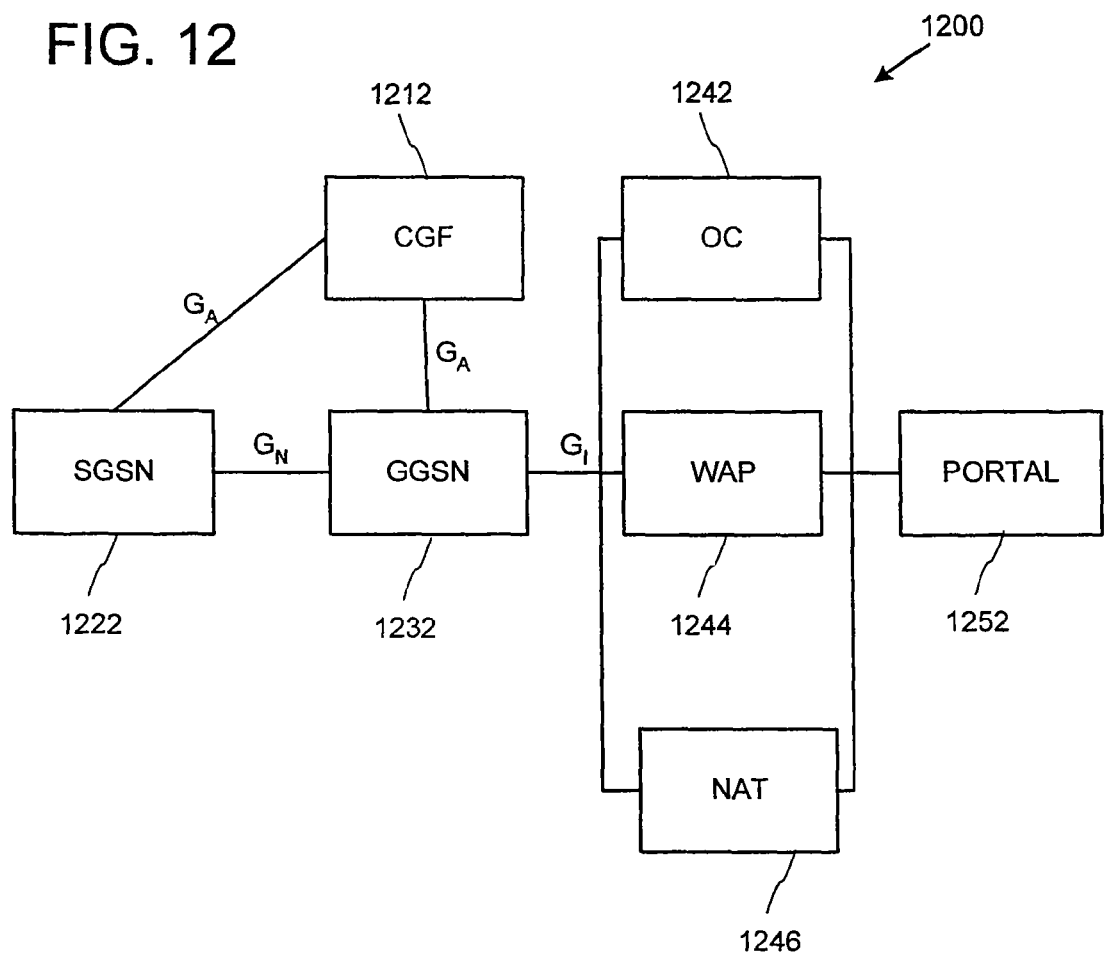
FIG. 12 is a block diagram showing an exemplary part of a wireless network configured to accommodate connection to an automated activation and provisioning server, including a portal.

FIG. 12 shows a block diagram of an exemplary part of a network 1200 configured to accommodate connection to an automated activation and provisioning server and illustrates GPRS relationship to the portal 1252.

The network portion 1200 can include the elements 1212, 1222, 1232, 1242, 1244, 1246, and 1252.

Exemplary elements that can be configured to accommodate an automated activation and provisioning server include the HLR 1132, the DNS (not shown), WAP gateway 1244, the portal 1252, firewalls, CFG 1212, and mediation (not shown).

For example, a special self activation access point name (APN) can be defined in the HLR 1232 and DNS. A range of IP addresses (e.g., somewhere between 10.128.0.0 and 10.223.255.255) can be defined and associated with the new self activation APN in the DNS. New core network rules can be defined to ignore the traffic (e.g., to prevent billing for it). And, new firewall rules can be as follows: Allow "WAP" traffic to/from the mobile station (in the new reserved range) and the WAP gateway(s); allow "OC" traffic to/from the mobile station (in the reserved range) and the Optimization Complex; configure the WAP gateway to support a non-provisioned subscriber; configure the portal to support (e.g., via URL steering) a non-provisioned subscriber, enhance OC to steer (e.g., captive portal) for reserved mobile range.

Example 18

Exemplary Provisioning Directives

A wide variety of provisioning directives can be supported. For example, a subscriber for whom provisioning has not yet taken place (sometimes called a "non-provisioned" subscriber) can direct provisioning by choosing to acquire a new account with a mobile wireless service provider and purchase monthly subscriptions for various feathers (e.g., text messaging and extended features).

The non-provisioned subscriber can establish a connection to the automated activation and provisioning server using a mobile wireless device. The WAP gateway and portal can present customized WAP menu screens on the mobile wireless device which prompt the subscriber to enter information for completing a credit check and set up a new account (e.g., name, billing address, social security number, etc.) as well as prompt the subscriber to select the desired monthly rate plan for the text messaging and extended features.

The automated activation and provisioning server can collect the information provided by the subscriber and initiate a sequence of automated provisioning events which will provision the customer's new account into the internal back-end systems (e.g., billing system, credit check server, online customer care system, etc.). In addition, the billing codes for the monthly rate plans for the text messaging services and extended features can be activated.

The automated activation and provisioning server can also acquire an assigned mobile number (e.g., MS-ISDN) for the subscriber. After the back-end provisioning process is completed by the automated activation and provisioning server, the server will request that the mobile number be sent over the air to the mobile wireless device (e.g., for programming into the device). After a short delay, the subscriber receives a message on the mobile wireless device notifying of the new mobile number and indicating that their new account and selected services have been activated. The subscriber can then begin using the mobile wireless device and services.

Exemplary provisioning directives in such a scenario are shown in Table 2.

TABLE 2

Exemplary Provisioning Directives

| Directive | Description |
| --- | --- |
| Billing system | Information is sent to the billing system so billing for a subscriber can be performed |
| Credit check | Information is sent to a credit check server to perform a credit check for the subscriber |
| Online customer care system | Information is sent to an online customer care system to allow the system to present automated support for the subscriber |
| Mobile number acquisition | A mobile number is acquired for a subscriber |
| Mobile number transmission | A mobile number is sent to the mobile wireless device |
| Completion message | A message is sent to the subscriber indicating that the mobile wireless device (e.g., and selected services) has been activated |

Example 19

Exemplary Web Browsing Systems

In some cases, web browsing systems are said to access the "wired web." Such terminology is used to distinguish wired (e.g., dial-up, cable modem, and DSL) connections from wireless ones. However, even in a "wired web" scenario, the signal may be transmitted wirelessly (e.g., via satellite).

Example 20

Exemplary Distribution Scenarios

Because automated activation and provisioning can be provided for a rich set of services, more distribution scenarios are feasible. For example, a potential subscriber can simply buy a mobile wireless device at a retail store, take the phone out of the store, answer questions about desired services via user interfaces presented on the mobile wireless device or the web, and initiate activation and provisioning for the desired services.

Two exemplary use cases for the automated activation and provisioning technologies include use cases for an indirect channel (e.g., brick and mortar store or virtual store), which can benefit from activation via wired web or activation via the mobile wireless device. In any of the examples described below, the mobile wireless device inventory can be associated with a particular wireless network service provider (e.g., who controls the automated activation and provisioning server).

Example 21

Figure 13:
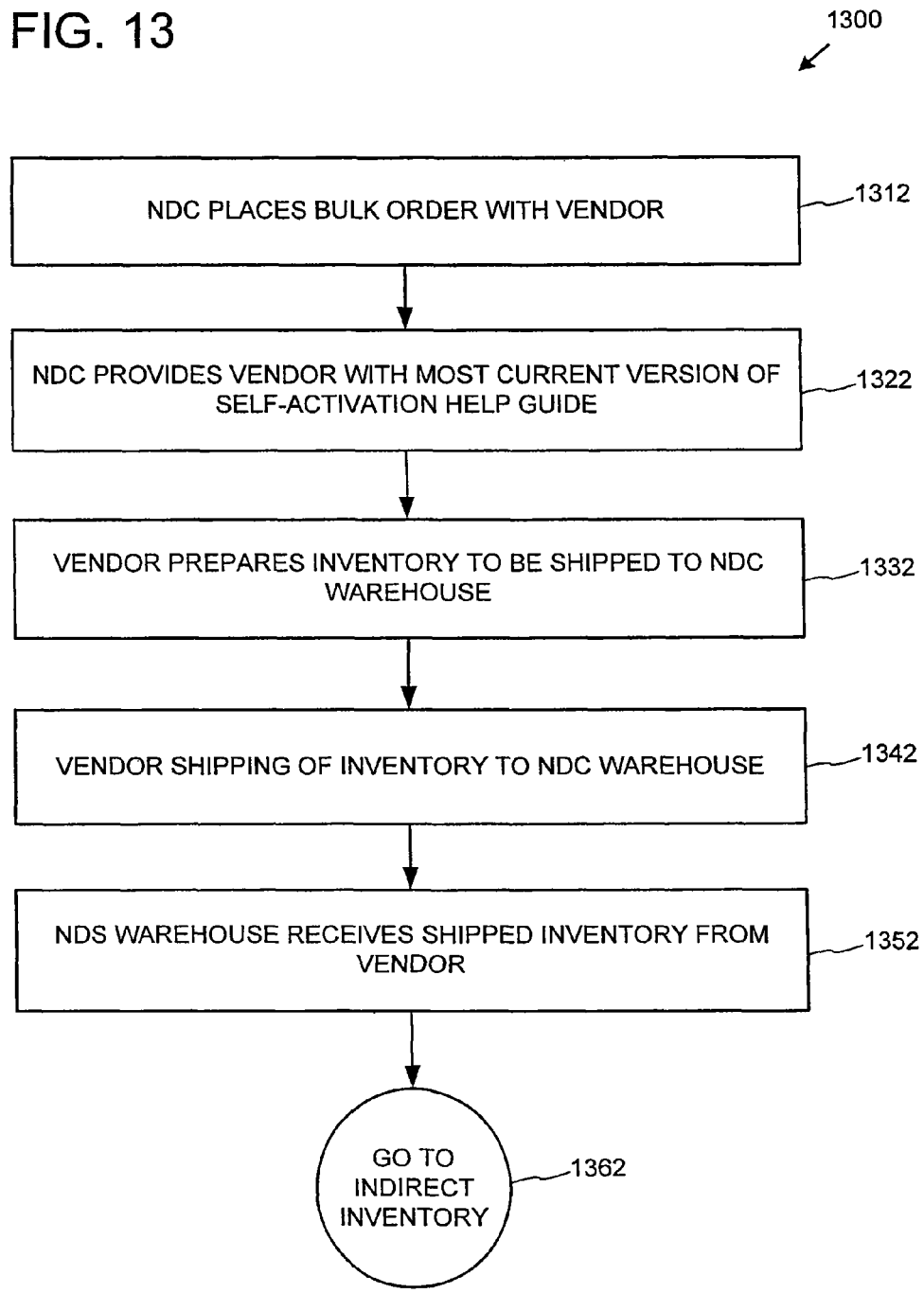
FIG. 13 is a flowchart showing an exemplary method by which automated provisioning can be applied to a scenario involving mobile wireless device inventory prepared by vendors.

Exemplary Distribution Scenario: Inventory Prepared by Vendors in Wired Web Scenarios FIG. 13 shows an exemplary method 1300 by which automated provisioning can be applied to a scenario involving mobile wireless device inventory prepared by vendors (e.g., a third party capable of providing unactivated mobile wireless devices to a national distribution center). The method 1300 can be applied to a variety of scenarios (e.g., self-activation via the wired web).

At 1312, a national distribution center places a bulk order with the vendor. For example, a national distribution center can contact the vendor and place a bulk order for device kits or SIM cards (e.g., 2.5G Device Kits or 2.5G SIM cards). Exemplary device kits can include a handset kit (e.g., handset and SIM card), a mobile connection kit (mobile connection software, SIM card, and GPRS modem), or a wireless PDA kit (e.g., RIM Blackberry with pre-installed software, GPRS modem, and SIM card).

At 1322, the national distribution center provides the vendor with the most current version of the self-activation help guide (e.g., which can be inserted into the boxes of inventory by the vendors).

At 1332, the vendor prepares the inventory to be shipped to the national distribution center warehouse. For example, the vendor representative can scan identifying information for a device kit (e.g., IMSI and IMEI) or SIM card (e.g., IMSI) into the vendor's inventory management system. Then, the vendor representative can insert the self-activation help guide into the box for the device kit or attach the help guide onto packaging for the SIM card. Such steps can be performed for inventory to be shipped to the national distribution center.

At 1342, the vendor can ship the inventory to the national distribution center warehouse. For example, the vendor representative can ship the prepared inventory to the national distribution center warehouse and tag the shipping order in their inventory management system as complete.

At 1352, the national distribution center warehouse receives the shipped inventory from the vendor. The national distribution center warehouse representative can then flag the bulk order as complete and put the inventory on shelves in their warehouse.

Figure 14:
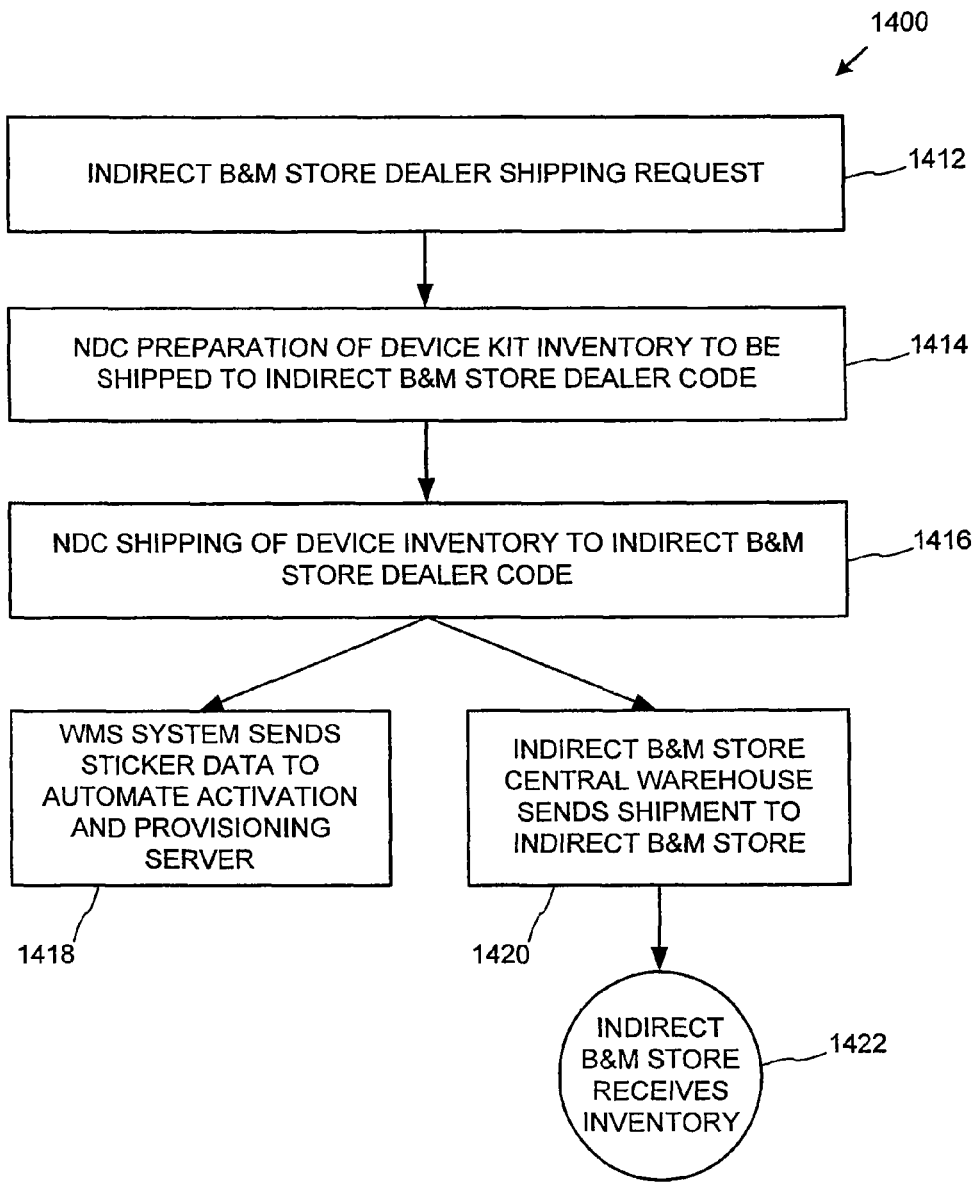
FIG. 14 is a flowchart showing an exemplary method by which automated provisioning can be applied to a scenario involving mobile wireless device inventory shipped to an indirect brick and mortar store.

At 1362, the method can continue with further actions for an indirect inventory scenario (e.g., those shown in FIG. 14).

Example 22

Exemplary Distribution Scenario: Inventory. Shipped to Indirect Brick and Mortar Store FIG. 14 shows an exemplary method 1400 by which automated provisioning can be applied to a scenario involving mobile wireless device inventory shipped to an indirect brick and mortar store. The method 1400 can be applied to a variety of scenarios (e.g., self-activation via the wired web or via the mobile wireless device).

At 1412, the indirect brick and mortar store dealer submits a shipping request. For example, an indirect brick and mortar store dealer can submit a request to distribution services for a shipping order (for device kits such as those described in the previous example) or SIM cards (e.g., 2.5G device kits or 2.5G SIM cards).

At 1414, the national distribution center can prepare device kit inventory to be shipped to the indirect brick and mortar store. For example, the national distribution center representative can select bulk inventory of device kits to be shipped to indirect brick and mortar store dealer. The national distribution center representative can scan identifying information (e.g., AW SKU, IMSI, ICC_ID, and IMEI) into the warehouse management system. The warehouse management system can automatically print a new sticker (e.g., or other indicia) and mount it onto the device kit. The national distribution center representative can complete these actions for the device kits in inventory to be shipped to the indirect brick and mortar store (e.g., identified by a dealer code).

At 1416 the national distribution center can ship the device inventory to the indirect brick and mortar store identified by a dealer code. For example, the national distribution center representative can ship the prepared device inventory to the indirect brick and mortar store warehouse. The national distribution center representative can note that the shipping order is complete in the wireless network services ("WNS") system.

At 1418, the warehouse management system can send the sticker data to the automated activation and provisioning server. For example, the national distribution center representative can confirm the receipt of the new sticker data by the server. The information can include device kit data field elements (e.g., IMSI, IMEI, temporary) and a user id (e.g., AW SKU and temporary password=ICC-ID).

At 1420, the indirect brick and mortar store central warehouse can send the shipment to the indirect brick and mortar store. For example, the central warehouse can send the shipment to the specific indirect brick and mortar store.

At 1422, the indirect brick and mortar store can receive the inventory and place it on the shelf in the store (e.g., for purchase by a retail customer).

Example 23

Exemplary Distribution Scenario: HLR and GGSN Preloads

Figure 15:
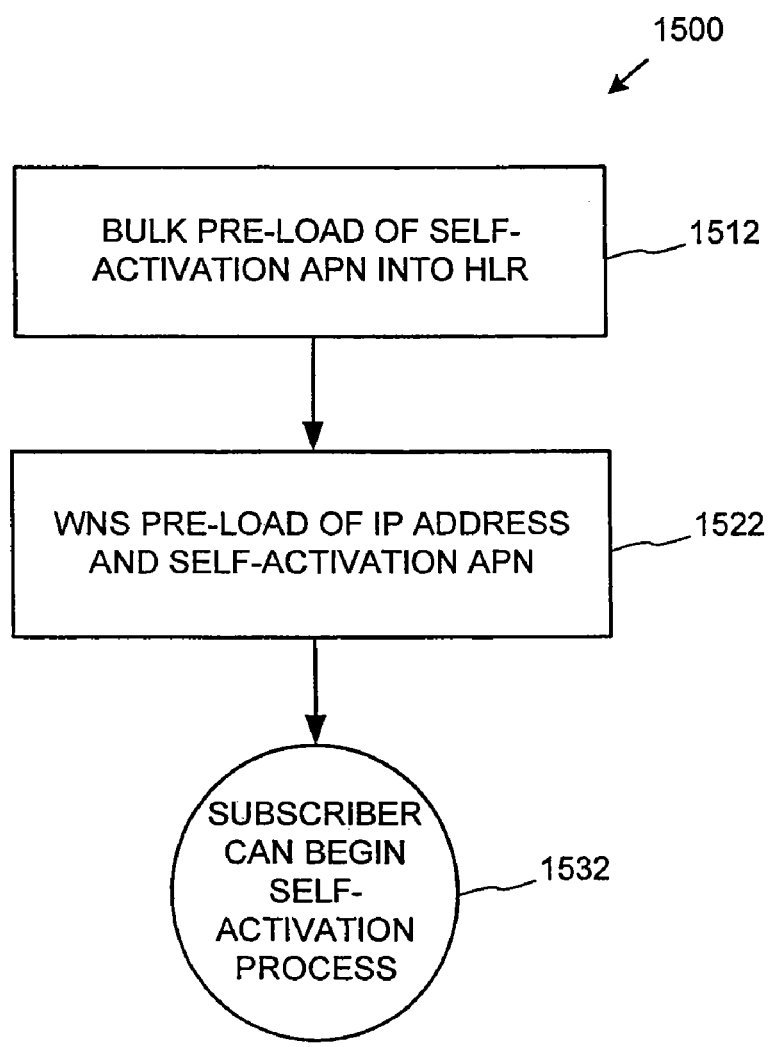
FIG. 15 is a flowchart showing an exemplary method for preloading information before a user begins a self-activation process.

FIG. 15 shows an exemplary method 1500 by which information can be preloaded before a user begins a self-activation process. The method 1500 can be applied to a variety of scenarios (e.g., self-activation via the wired web or via the mobile wireless device).

At 1512, a WNS provider (e.g., the WNS IT department) can perform a bulk pre-load of self-activation APN into HLR. The process can look up the IMSI in the HLR for each data entry and preload a special Self Activation PDP into the HLR. The data entry can have a temporary MS-ISDN assigned to it. The process can complete this bulk preload for all new data entries in the automated activation and provisioning server (e.g., from 1418 of FIG. 14).

At 1522, the WNS (e.g., a network engineer) performs a pre-load of IP addresses and self-activation APN. For example, GGSN and SGSNs can be configured with a self-activation APN. The WNS can then configure proxied IP addresses for self-activation interface/scripts in the firewall. For example, different proxied IP addresses can be used for the handset and RIM devices.

Figure 18:
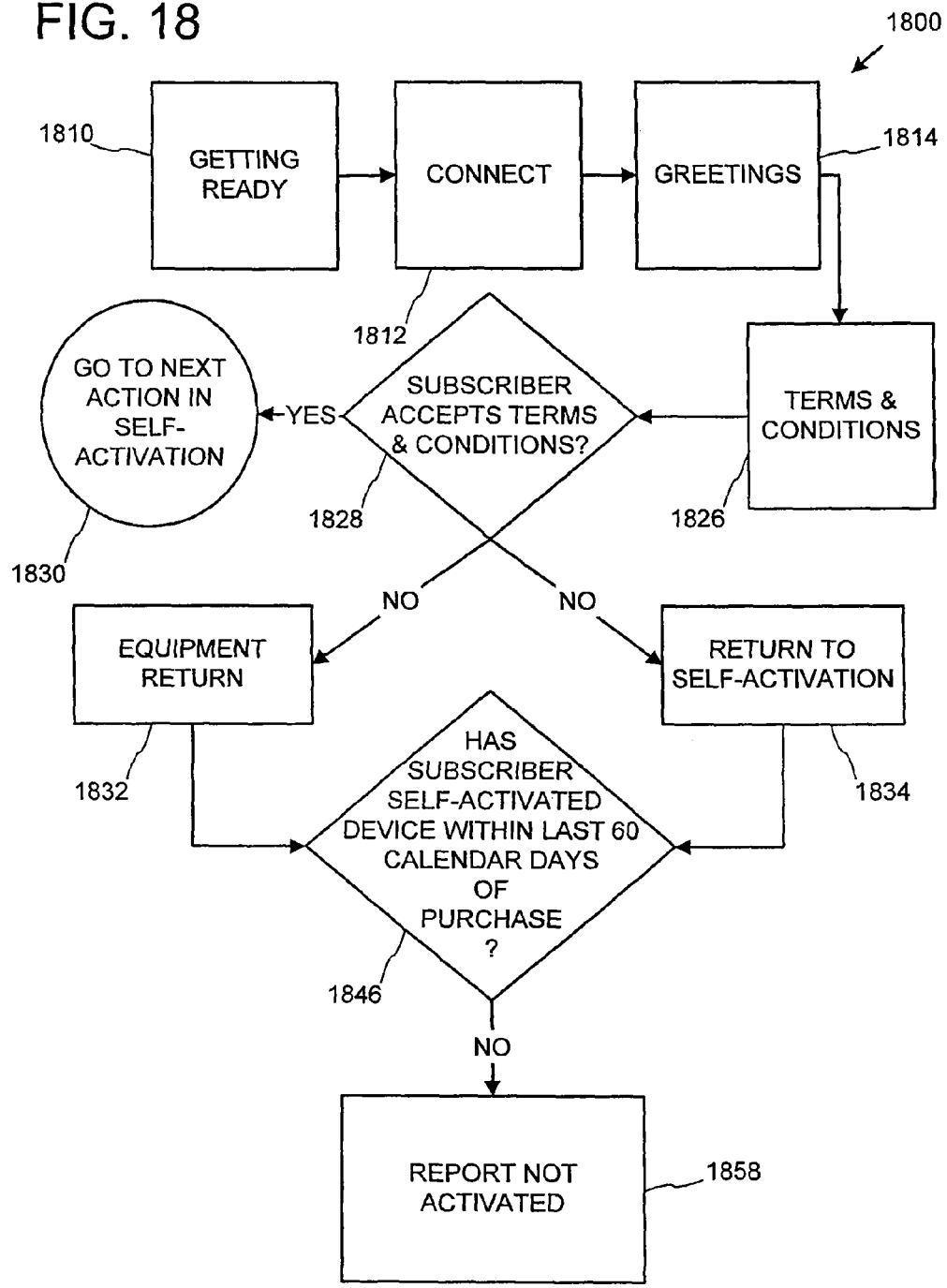
FIG. 18 is a flowchart showing an exemplary method by which a subscriber begins a self-activation and automated provisioning process.

At 1532, the subscriber (e.g., customer of the device) can begin the self-activation process (e.g., as shown in FIG. 18).

Example 24

Figure 16:
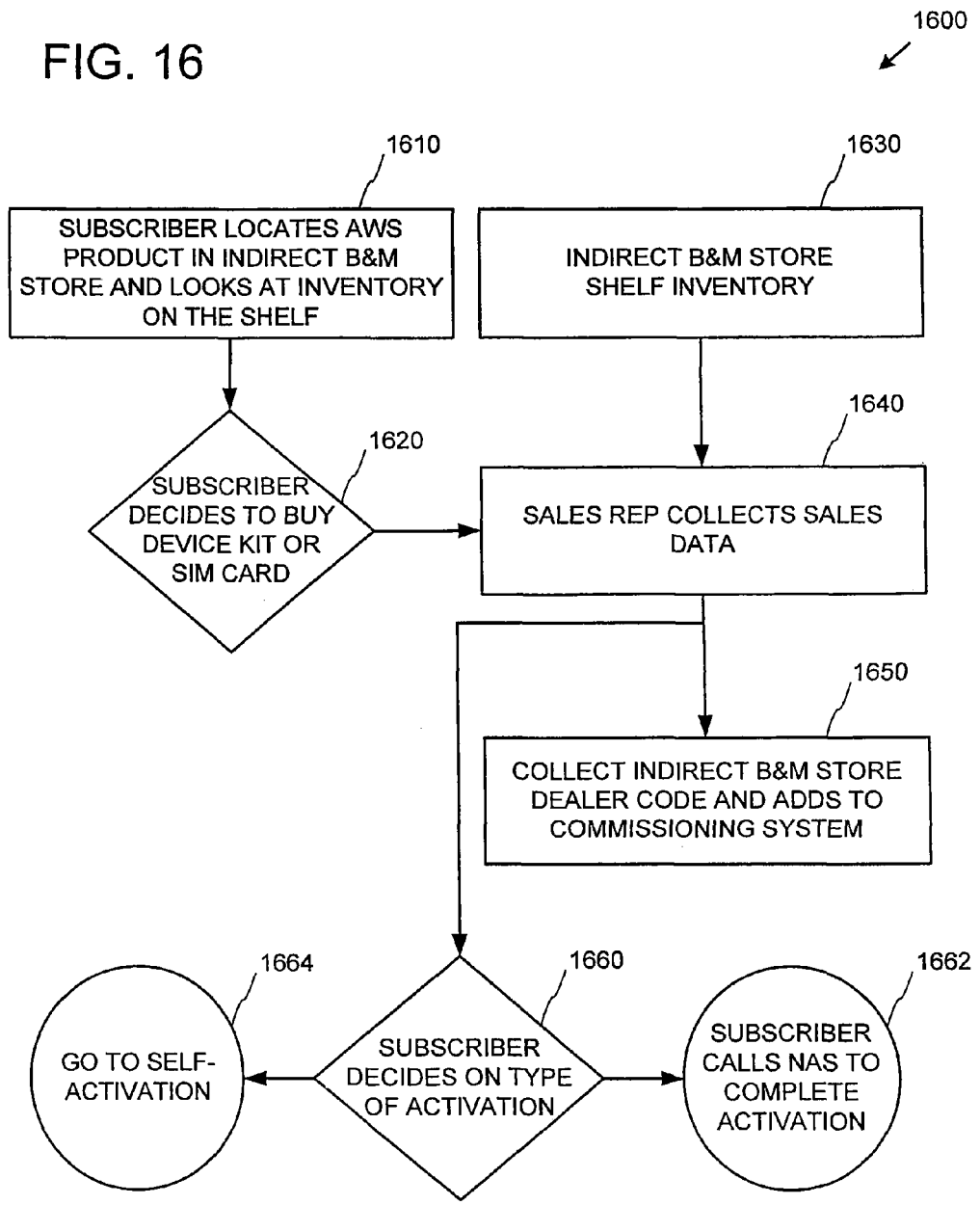
FIG. 16 is a flowchart showing an exemplary method for subscriber purchase at an indirect brick and mortar store.

Exemplary Distribution Scenario: Customer Purchase of Device Kit or SIM Card at Indirect Brick and Mortar Store FIG. 16 shows an exemplary method 1600 for subscriber purchase at an indirect brick and mortar store. The method 1600 can be applied to a variety of scenarios (e.g., self-activation via the wired web or via the mobile wireless device).

At 1610, the subscriber (e.g., a customer of the device) locates the product (e.g., mobile wireless device) shelf in an indirect brick and mortar store and looks at the inventory on the shelf. The project can be associated with a particular wireless network service provider.

At 1620, the subscriber decides to buy a device kit or a SIM card. As shown in 1630, the shelf inventory is prepared as follows: Device kits have stickers with IMSI, IMEI, and temporary user id and password. SIM cards have the self-activation brochure enclosed in the packaging.

At 1640, a sales representative collects sales data. For example, the indirect brick and mortar store dealer code can be collected.

At 1650, the wireless network service provider can collect the dealer code and add to a commissioning system so that the proper commission can be sent back to the indirect brick and mortar store (e.g., by the wireless network service provider).

At 1660, the customer pulls out the brochure and decides on the type of activation. At 1662, the customer decides to contact network activation services (e.g., to hold a conversation with a representative) to achieve activation. At 1664, the customer decides to achieve activation via self-activation (e.g., via the wired web or the mobile wireless device).

Example 25

Exemplary Activation Scenarios and User Interfaces

The technologies described herein can be achieved by presenting a subscriber with an electronic user interface (e.g., that of a web browser or some other user interface presented, such as that on a mobile wireless device). The subscriber can thus choose to activate a device via the wired web or the device itself. The user interfaces can be presented via the automated activation and provisioning server, can guide the subscriber during activation process, and can result in automated provisioning.

Although possibly similar on both full-screen web browsing systems and smaller (e.g., handheld) devices, customization of presentation can be done to accommodate for lack screen real estate. Further, user input can be collected in different ways (e.g., using a fewer number of keys than a standard keyboard).

Example 26

Exemplary Activation Scenario: Customer Selection of Self-Activation Method

Figure 17:
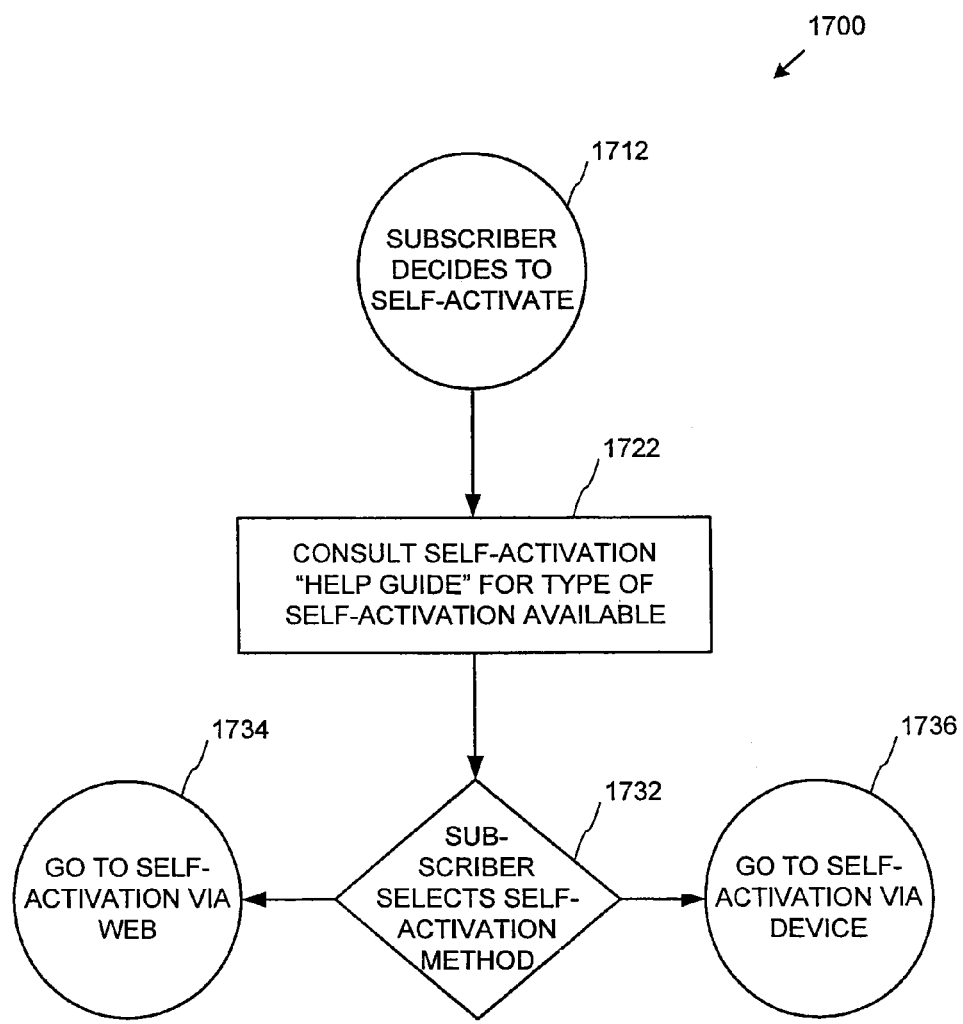
FIG. 17 is a flowchart showing an exemplary method by which a subscriber chooses a self-activation method.

FIG. 17 shows an exemplary method 1700 by which a subscriber chooses a self-activation method. At 1712 the subscriber chooses to self-activate (e.g., action 1660 of FIG. 16).

At 1722 the subscriber consults the self-activation help guide for the type of self-activation available. For example, the subscriber can open the box and consult the help guide for the type of self-activation method available for the device type purchased. For example, the device types eligible for self-activation via the wired web can include a new SIM card for WNS provider equipment with WNS provider SKU/part number; mobile connection kit for notebook or pocket PC; wireless PDA kit (e.g., RIM Blackberry kit); and handset kit. The device types eligible for self-activation via device include a wireless PDA kit (e.g., RIM Blackberry kit); handset kit; and new SIM card for WNS provider equipment with WNS provider SKU/part number (e.g., depending on device type). At 1732, the subscriber selects the self-activation method. At 1734, the customer has decided to use the web for self activation. At 1736, the customer has decided to use the device for self activation.

Example 27

Exemplary User Interface: Getting Ready

FIG. 18 shows an exemplary method 1800 by which a subscriber begins a self-activation and automated provisioning process. The method 1800 can be applied to a variety of scenarios (e.g., self-activation via the wired web or via the mobile wireless device).

At 1810, the customer prepares to begin. For example, for a handset kit, the subscriber can take the handset (e.g., mobile wireless device) out of the box; consult the self-activation "getting ready" checklist; insert the battery into the handset; remove the SIM card from packaging and insert into the handset; charge the handset; and find the temporary user id and password on the sticker with box.

For a mobile connection kit, the subscriber can consult the self-activation "getting ready" checklist; find the temporary user id and password on a sticker with the box; open the mobile connection kit; install the SIM card/GPRS modem into the pocket PC or laptop; install mobile connection software; and go through self-guided steps.

For a wireless PDA kit (e.g., RIM Blackberry kit), the subscriber can consult the self-activation "getting ready" checklist, and find the temporary user id and password on the sticker with the box.

For a SIM card, the subscriber can consult the self-activation "getting ready" checklist.

At 1812, a connection can be achieved. If using the wired web, the subscriber navigates to a web site (e.g., an URL). If using the device, the user turns on the device, which results in connection the network (e.g., GPRS network). For a SIM card, the subscriber can insert the SIM card into a device and turn on the device.

For example, for a handset kit, connection can be achieved between the device and the network (e.g., GPRS network). The device can initiate a GPRS attach and PDP context; the SGSN can authenticate the handset and permit access to the GPRS network; the GGSN can trap the IMSI and point the device to HLR. The HLR looks up the IMSI and sees a special self-activation PDP. The HLP points the handset to the IP address for self-activation space on the WAP gateway.

For a wireless PDA (e.g., RIM Blackberry) kit, the device can initiate a GPRS attach and PDP context. The SGSN can authenticate the wireless PDA and permit access to the GPRS network. The GGSN traps the IMSI and points the device to HLR. The HLR looks up the IMSI and sees a special self-activation PDP. The HLR points the handset to the IP address for self-activation space on REM gateway.

For a SIM card, the device can initiate a GPRS attach and PDP context. The SGSN can authenticate the device and permit access to the GPRS network. The GGSN can trap the IMSI and see a special self-activation PDP. The HLR points the device to the IP address for self-activation space on the WAP gateway.

At 1814, greetings are provided. For example, the greetings shown in Table 3 can be shown. In scenarios involving the wired web, an additional condition can be listed (e.g., under "If you can answer yes . . . "): "I have [browser name(s)] with x bit encryption." Further, in scenarios involving the wired web, the greetings can include an advisory indicating that the device should be turned on before starting the process.

TABLE 3

Exemplary Greetings for Activation

Greetings! Welcome to the Self-Activation Process
If you can answer yes to the following, then let's proceed!
* I am activating a new wireless device or SIM card for my individual name or family account name.
* I have an email address
We will then take you through the steps to design your mobile wireless services profile. This will include the following steps:
* register an account with us
* complete a secure credit check
* choose a rate plan and add any additional features to your account
* acquire a new phone number
* set up a payment plan
* select and customize new services for your individual or family account name
The design process will take n minutes to complete.

Then, at 1826, a terms and conditions user interface can be presented. Such a user interface can either list the terms and conditions, or make reference to or outline terms and conditions in the self-activation help guide. Via the user interface, the user can select to accept or reject the terms and conditions.

At 1830, if the user has indicated that the terms and conditions are accepted, the next action for self-activation can be performed.

If the user has indicated that the terms and conditions are not accepted, at 1832, a user interface is presented indicating that the device can be returned to the store from which it was purchased for a refund (e.g., within so many days). At 1834, a user interface is presented indicating that the subscriber can return to the self-activation process (e.g., at anytime within so many days).

At 1846, it is detected whether the subscriber has self-activated the device within the last so many days of purchase. If not, at 1858, an indication is made (e.g., in the automated activation and provisioning server) that the device was sold but not activated within the threshold number of days.

Example 28

Exemplary User Interface: Device Type and Discovery

Figure 19:
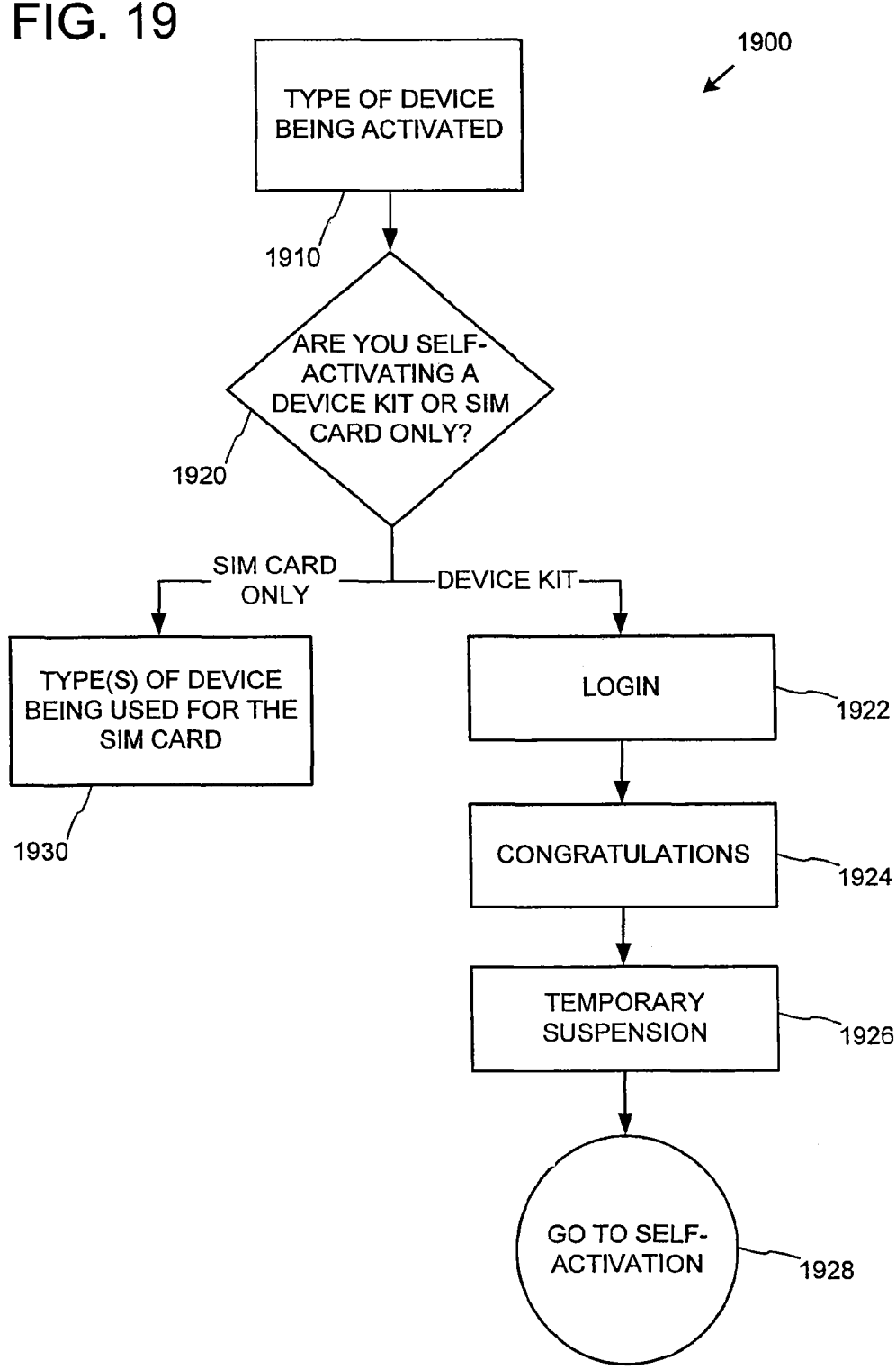
FIG. 19 is a flowchart showing an exemplary method by which user interfaces are presented to determine a device type.

FIG. 19 shows an exemplary method 1900 by which user interfaces are presented to determine a device type. The method 1900 can be applied to a variety of scenarios (e.g., self-activation via the wired web or via the mobile wireless device).

At 1910, a user interface is presented by which the user can choose whether activating a device kit or a SIM card only. At 1920, the subscriber's selection is received.

If the subscriber selects "SIM card only," at 1930, the subscriber is asked to enter the temporary user ID and password (e.g., a user interface can be presented indicating the user ID is the SKU number and is found on the label mounted on the package for the device to be used with the SIM card). The password can be the 20-digit ICC-ID. Processing can then continue (e.g., via action 1926).

If the subscriber selects "Device Kit," at 1922, the subscriber is asked to enter the temporary user ID and password (e.g., a user interface can be presented indicating the user ID is the SKU number and is found on the label mounted on the package for the device. The password can be the 20-digit ICC-ID.

At 1924, a congratulatory message can be displayed (e.g., "You have purchased a new x"). The device name can be retrieved from the IMEI in the self-activation EDW.

At 1926, a user interface can be presented informing the user that personal information will be collected. The subscriber can also be informed that the process can be temporarily suspended at any time by clicking on "log out" and later returning and entering the OCS login name and resuming. Thus, the subscriber can go through the process at a time of the subscriber's choosing.

At 1928, further self-activation actions can be performed (e.g., those of the following example).

In some cases, a subscriber may have lost the associated sticker. Instructions can be provided to the subscriber indicating alternative locations at which the information can be found (e.g., on the device itself).

Example 29

Figure 20:
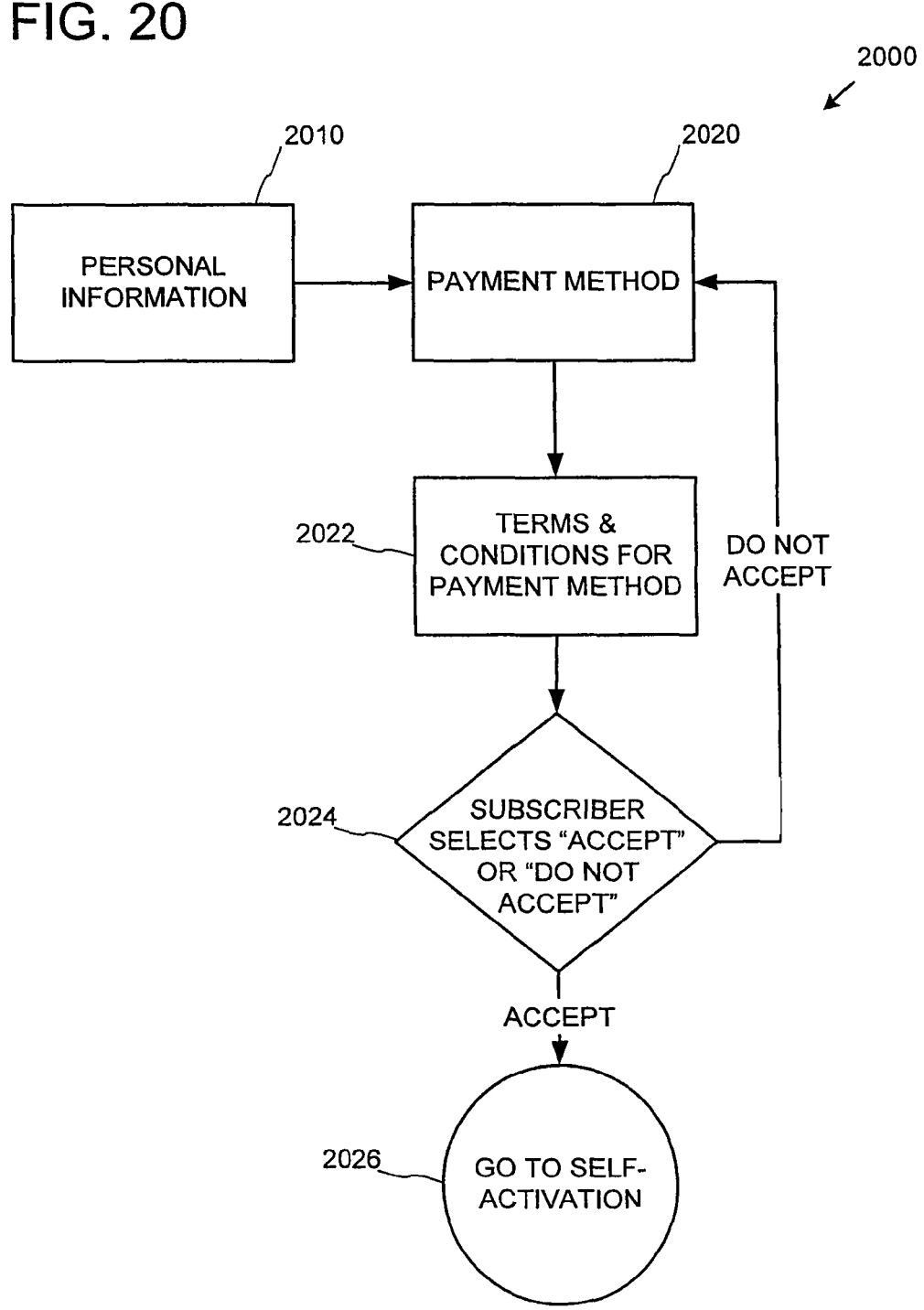
FIG. 20 is a flowchart showing an exemplary method by which user interfaces are presented by which a subscriber can enter personal information and select billing and payment methods.

Exemplary User Interface: Customer Personal Information Entry and Selection of Billing and Payment Methods FIG. 20 shows an exemplary method 2000 by which user interfaces can be presented by which a subscriber can enter personal information and select billing and payment methods. The method 2000 can be applied to a variety of scenarios (e.g., self-activation via the wired web or via the mobile wireless device).

At 2010, a user interface is presented by which personal information is collected. For example, a user interface as shown in Table 4 can be presented.

TABLE 4

Exemplary User Interface for Collecting Personal Information

Please enter the following information for your account:
First/Last Name
Home Address w/City, State, ZIP
Home Telephone
Work Telephone
Email address
Social Security Number
Date of Birth (MM/DD/YYYY)
Drivers' License or State ID Number
Credit Card Type
Credit Card Number
Credit Card Expiry Date
Check if you do not wish to receive occasional emails from us about new offers, product and services we think will interest you.
Where do you use your phone? Please softkey the area.
Privacy Policy
Concerned about your privacy? If so, please read our privacy policy. Click here.
Thank you for entering in your information!

At 2020, a user interface for selecting a payment method is presented. For example, the following can be presented: "Please select your preferred billing option: Bill in advance or Bill in arrears" and "Please select your preferred payment method: Electronic Funds Transfer (EFT), Credit Card Payment, Pay by Check after receiving statement, or Monthly Recurring Payment."

At 2022, a user interface for terms and conditions can be presented. For example, the terms can be presented or a reference to a Help Guide included with the device can be presented. At 2024, the user either accepts or rejects the terms and conditions. If the terms are not accepted, processing returns to 2020. If the terms are accepted, more self-activation processing continues at 2026 (e.g., the processing shown in the following example).

Example 30

Exemplary User Interface: Failed Credit Check

Figure 21:
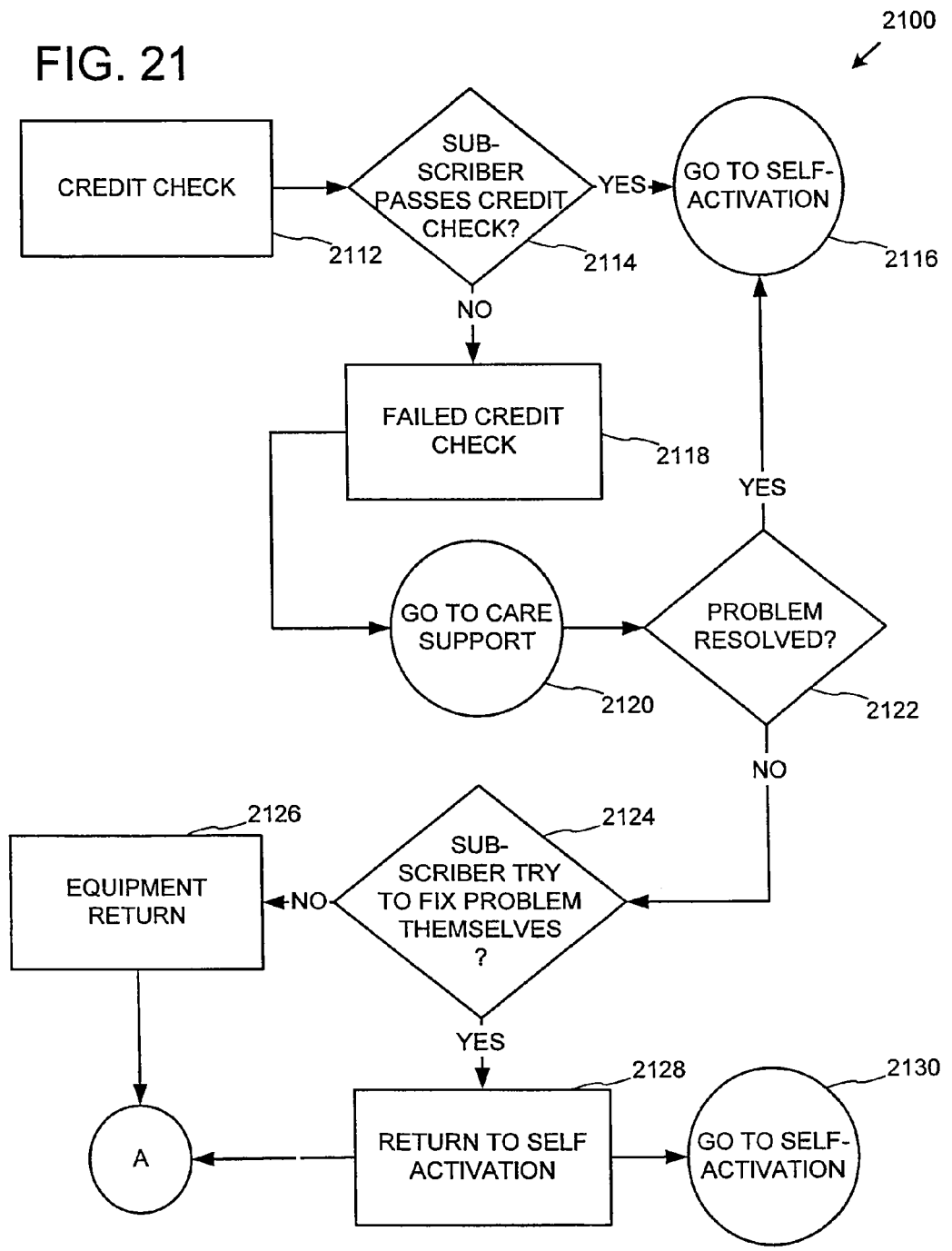
FIG. 21 is a flowchart showing an exemplary method by which user interfaces are presented related to a credit check.

FIG. 21 shows an exemplary method 2100 by which user interfaces can be presented related to a credit check. The method 2100 can be applied to a variety of scenarios (e.g., self-activation via the wired web or via the mobile wireless device).

At 2112, a credit check is performed using the personal information entered by the subscriber. For example, a user interface can be presented advising on how long the credit check will take. The credit check can be performed in real time as the subscriber is entering the information and return in seconds (e.g., 10-15 seconds).

At 2114, it is determined whether the subscriber passed the credit check. If so, at 2116, further self-activation processing is performed (e.g., as shown in the following example).

If the subscriber does not pass the credit check, at 2118, an appropriate user interface can be presented. For example, the following can be presented: "We're sorry, but the credit check came back indicating that a security deposit is required. Please press the x softkey and your call will be hotlined to one of our National Activation Services (NAS) care representatives who will be able to assist you. At 2120, the subscriber is connected to a care representative (e.g., via a voice call). At 2122, it is determined whether the problem was resolved. If so, processing can continue at 2116.

If the problem is not resolved, at 2124, the subscriber can be asked whether they wish try to fix the problem themselves. If so, the customer is notified that they can return to the self activation process at anytime within the next so many calendar days at 2128. Processing can return to the getting ready process of FIG. 18.

If not, the subscriber is notified that they can return the device within so many days for a refund at 2126.

Figure 22:
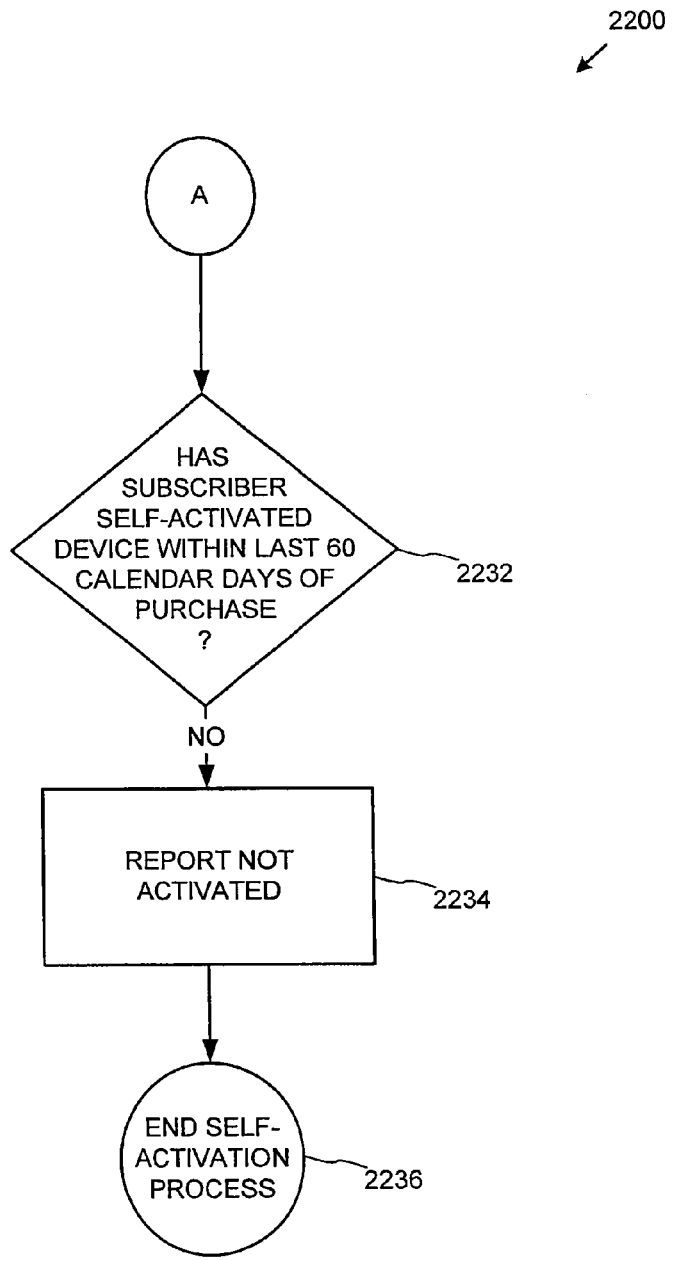
FIG. 22 is a flowchart showing an exemplary method for tracking unactivated devices.

FIG. 22 shows a method 2200 for tracking unactivated devices in conjunction with the method 2100. At 2232, it is detected whether the subscriber has self-activated the device within the last so many days of purchase. If not, at 2234, an indication is made (e.g., in the automated activation and provisioning server) that the device was sold but not activated within the threshold number of days. At 2236, the self-activation process is ended.

Example 31

Exemplary User Interface: Rate Plan Selection

Figure 23:
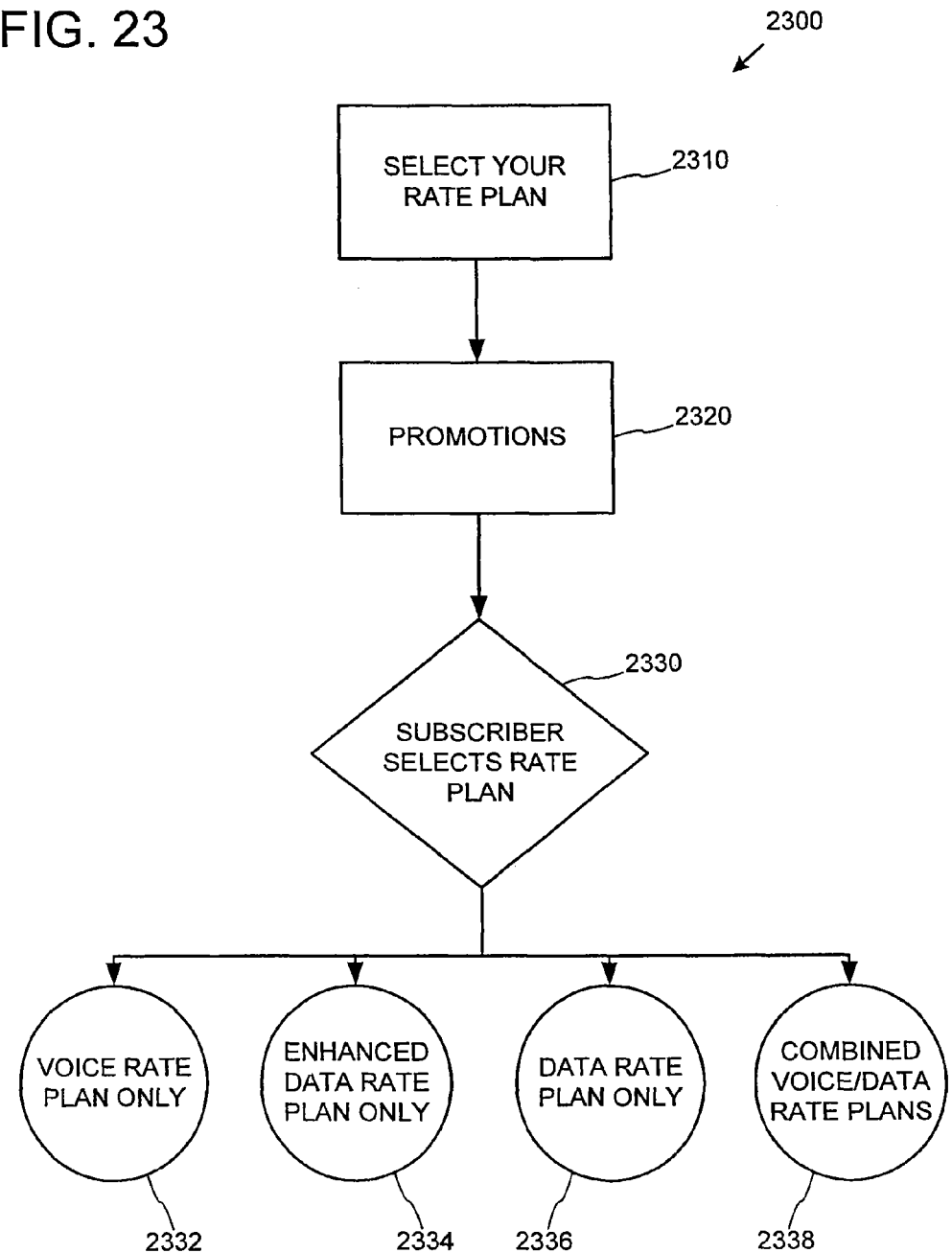
FIG. 23 is a flowchart showing an exemplary method for presenting user interfaces by which rate plan selection can be achieved.

FIG. 23 shows an exemplary method 2300 for presenting user interfaces by which a rate plan can be selected by a subscriber. The method 2300 can be applied to a variety of scenarios (e.g., self-activation via the wired web or via the mobile wireless device).

At 2310, a subscriber is presented with one or more rate plan selection user interfaces. For example, a list of possible plans can be presented, and the subscriber can select one via the user interface. Alternatively, the user can be asked a set of questions for assisting in choosing a rate plan. For example, questions can be asked regarding lifestyle, geography, long distance usage, and data use. Based on the questions, a rate plan can be selected for the user, or a list of plans can be presented to the subscriber from which the user can select. Features related to the plans can be displayed for consideration or confirmation by the subscriber.

Rate plans can include a wide variety of configurations (e.g., any combination of voicemail, call forwarding, x minutes, text messaging, y megabytes of storage, and the like).

At 2320, after selection of the plan, promotions can be displayed. For example, the promotions can be based on the selected rate plan. Recommended promotions can be listed based on the questions asked in 2310. Again, a subscriber can select from a list of one or more displayed promotions, if any.

At 2330, based on the subscriber's choice, different processing can take place. For example, the choices can be between a voice rate plan 2332, an enhanced data rate plan 2334, a data rate plan 2336, and combined voice/data rate plans 2338. In such an example, processing can proceed with the actions shown in the following example (e.g., FIG. 24), except for the data rate plan only, which can proceed with the actions shown in FIG. 25.

Example 32

Exemplary User Interface: Selection of Voice Services

Figure 24:
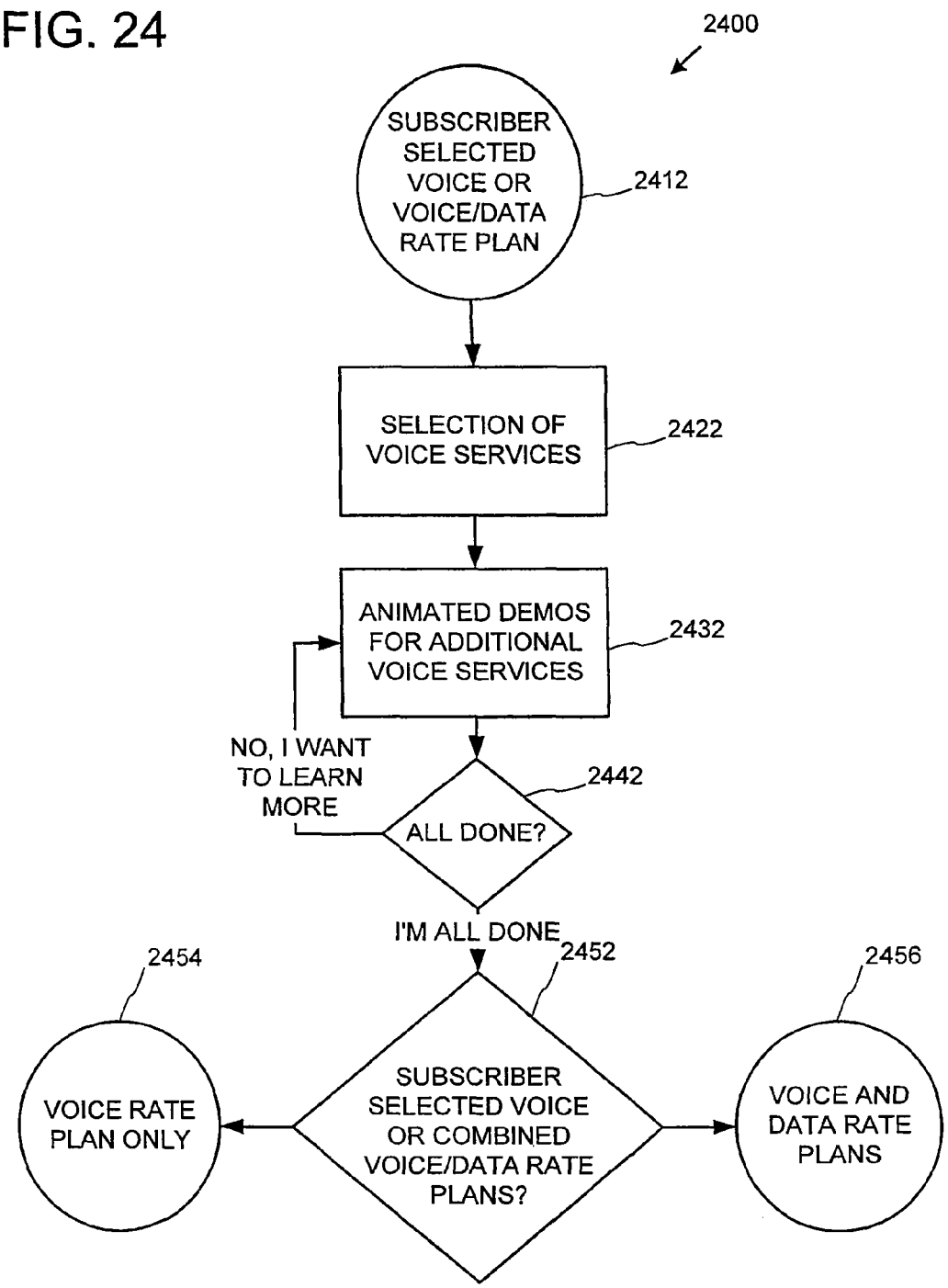
FIG. 24 is a flowchart showing an exemplary method for presenting user interfaces by which a subscriber can select services.

FIG. 24 shows an exemplary method 2400 for presenting user interfaces by which a subscriber can select services. The method 2400 can be applied to a variety of scenarios (e.g., self-activation via the wired web or via the mobile wireless device).

At 2412, the user has selected a voice or voice/data rate plan (e.g., as part of the actions shown in FIG. 23). At 2422, a subscriber can select voice services for the configuration.

For example, the subscriber can be presented with a user interface asking for service selections from those listed (e.g., text messaging options, unified messaging, mobile assist, equipment insurance, mobile to mobile minutes, voice activated dialing, and the like).

If desired, animated demos can be shown for additional voice services at 2432. The demos can be omitted from processing if desired.

At 2442, the subscriber is asked whether selection is completed. If not, more can be shown at 2432. If done, processing can be directed to appropriate action based on determining whether voice or combined voice/data was selected at 2452. If a voice plan only was selected, processing can continue at 2454. Otherwise, processing can continue at 2456.

Example 33

Exemplary User Interface: Selection of Data Services

Figure 25:
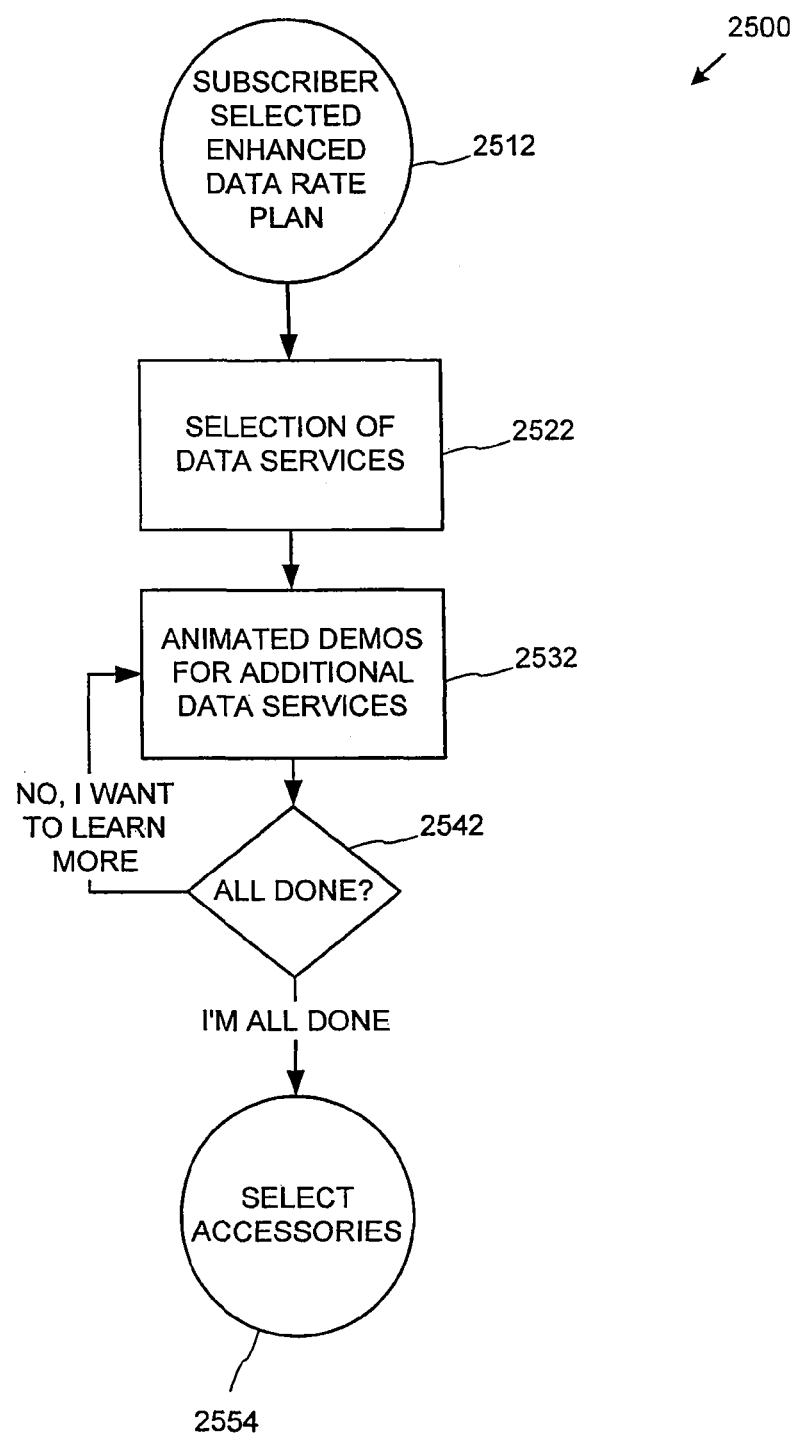
FIG. 25 is a flowchart showing an exemplary method for presenting user interfaces by which a subscriber can select data services.

FIG. 25 shows an exemplary method 2500 for presenting user interfaces by which a subscriber can select data services. The method 2500 can be applied to a variety of scenarios (e.g., self-activation via the wired web or via the mobile wireless device).

At 2512, the subscriber has selected a data rate plan (e.g., via 2456 or 2336). At 2522, a user interface is presented by which a subscriber can select data services for inclusion in their configuration. The automated activation and provisioning server can limit (e.g., based on the device type) the presented services to those appropriate for the device (e.g., the purchased device or device being used with the purchased SIM card). For example, the services can include email access services, image services, game services, transactional electronic payment system services, geographic location services, instant messaging services, ringtone services, graphics services, and the like.

If desired, at 2532, animated demos for data services can be shown. In some cases (e.g., activation via device), it may be desirable to omit such animated demos.

At 2542, a user interface is presented by which the subscriber can indicate whether the process of selecting services is finished. If not, more information can be shown (e.g., at 2532). If finished, processing can continue at 2554, by which the subscriber can purchase accessories for the device.

Example 34

Exemplary User Interface: Purchase of Accessories

Figure 26:
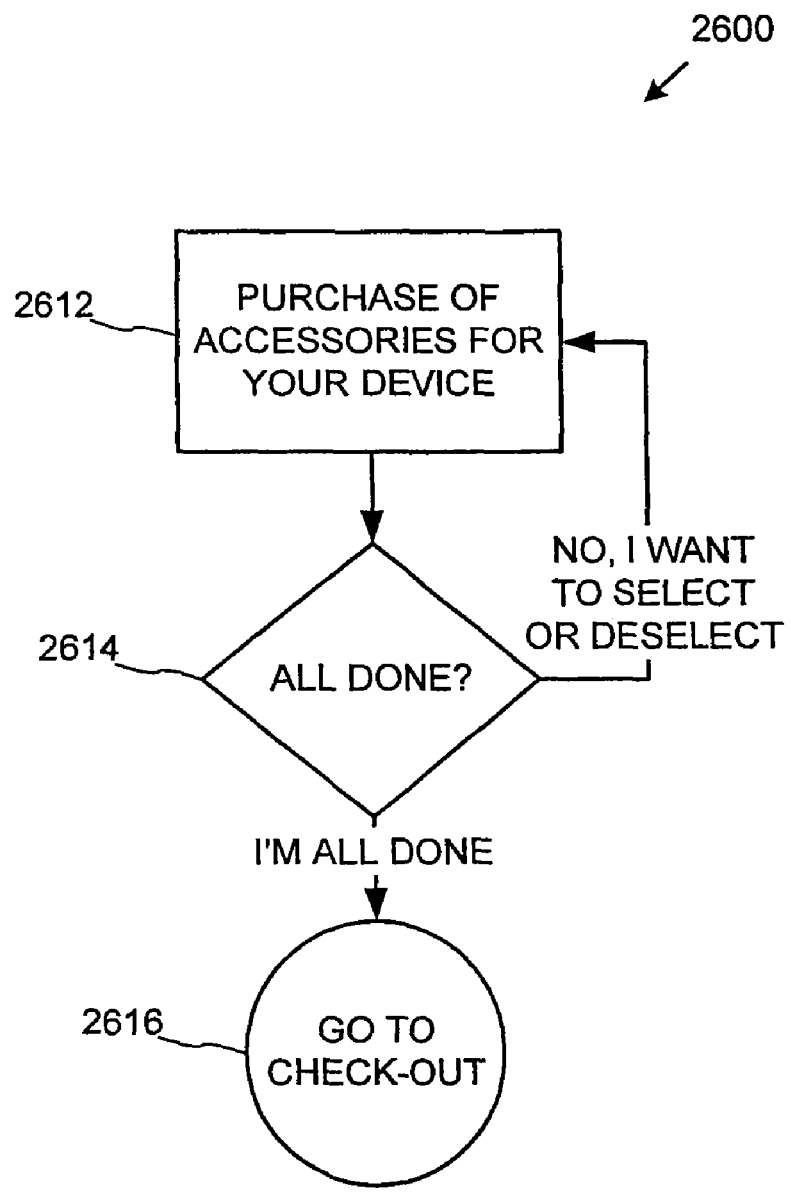
FIG. 26 is a flowchart showing an exemplary method for presenting user interfaces by which a subscriber can purchase accessories for a mobile wireless device.

FIG. 26 shows an exemplary method 2600 for presenting user interfaces by which a subscriber can purchase accessories. The method 2600 can be applied to a variety of scenarios (e.g., self-activation via the wired web or via the mobile wireless device).

At 2612, one or more user interfaces are presented by which a subscriber can select accessories of the mobile wireless device for purchase. The automated activation and provisioning server can limit (e.g., based on the device type) the presented accessories listed for selection to those that apply to the device kit, handset, mobile connection, wireless PDA, or devices selected for the SIM card. For example, devices listed can include an earbud, headset, loopset, batter charger, and the like. In addition, an option can be displayed indicating that the subscriber can contact a store representative to purchase accessories.

At 2614, it is determined whether the subscriber is finished. If not, processing can continue at 2612. If finished, processing can proceed to checkout at 2616.

Example 35

Exemplary User Interface: Check-out and Order Summary

Figure 27:
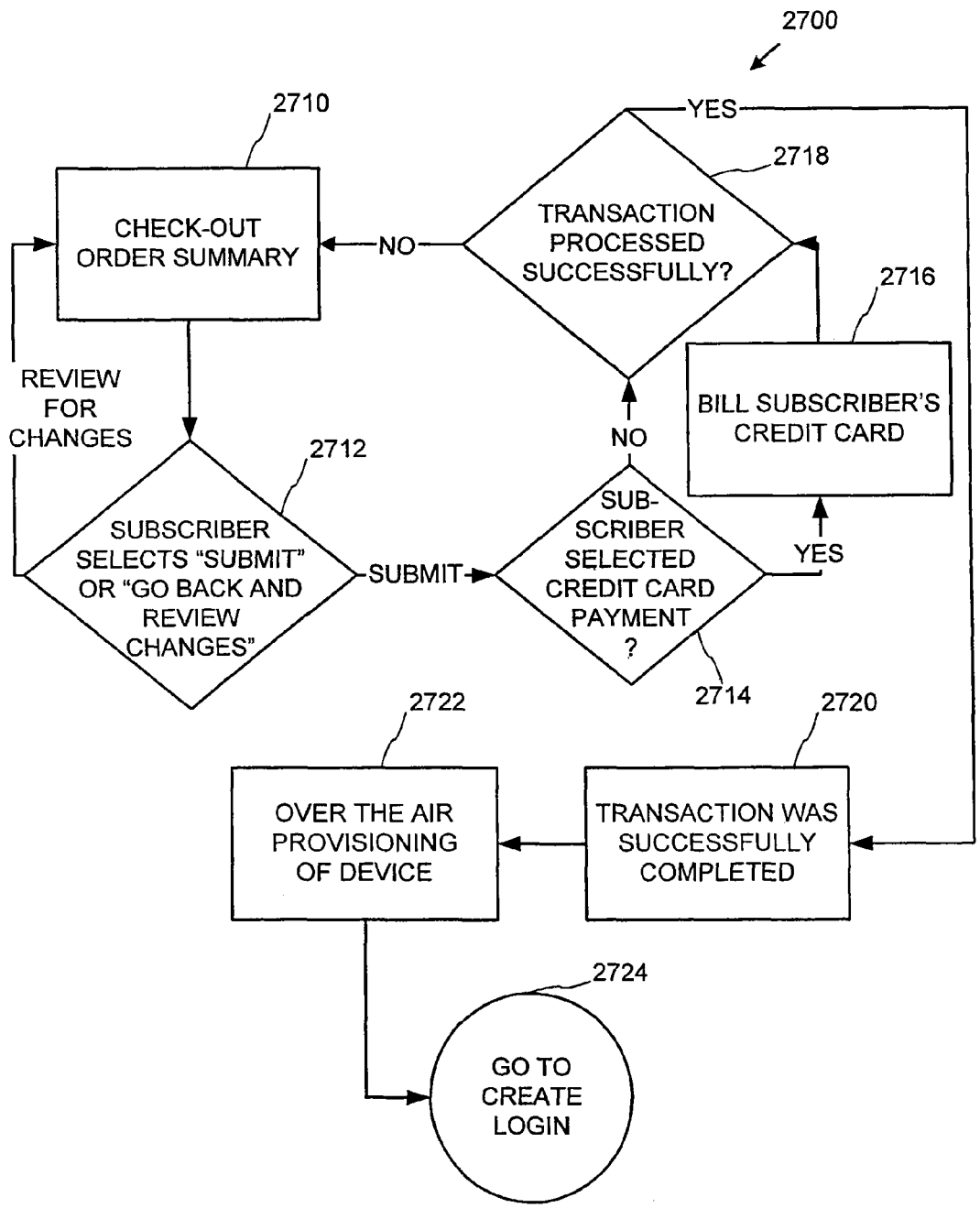
FIG. 27 is a flowchart showing an exemplary method for presenting user interfaces by which a subscriber can complete check out.

FIG. 27 shows an exemplary method 2700 for presenting user interfaces by which a subscriber can complete check out. The method 2700 can be applied to a variety of scenarios (e.g., self-activation via the wired web or via the mobile wireless device).

At 2710, one or more user interfaces are presented by which a subscriber is shown a summary of the selections made during self-activation. A total monthly charge, applicable taxes, if any, and total to be charged can also be shown. For example, Table 5 shows an exemplary user interface.

TABLE 5

Exemplary User Interface for Order Summary

Device Kit = <Name of Device Kit>
Rate Plan = <Names of Selected Rate Plans>
Promotions = <Names of Promotions>
Additional Services Selected for Portfolio
   <Names of Voice and Data Services Selected>
Accessories = <Names of Accessories purchased>
Total Monthly Charges = $xx.xx
Taxes = $yy.yy
Total to be Charged = $zz.zz At 2712, the subscriber selects "submit" or "go back and review." If "go back and review" has been selected, the order summary can be shown again at 2710. If the subscriber selected "submit," processing can continue at 2714, where it is determined whether the subscriber selected credit card payment. If so, the credit card is billed at 2716. If not, it is determined whether the transaction was processed successfully at 2718. If not, the order is reviewed for errors, and processing can return to the order summary at 2710.

If the transaction was processed successfully, a user interface so indicating can be displayed on the mobile wireless device at 2720. In some cases (e.g., except for a mobile connection kit), the assigned phone number and profile name for the subscriber can be displayed. An advisory indicating that if the proper logo does not appear on the mobile wireless devices within so many minutes, that customer care should be contacted at a displayed number (e.g., toll free).

At 2722, over-the-air provisioning of the device can be performed. For example, the technologies described herein can be used to send appropriate provisioning directives (e.g., the assigned phone number and service parameters) to the mobile wireless device and other provisioning elements. Provisioning can include directives sent to back end elements.

At 2724, processing can continue by which a login can be created.

Example 36

Exemplary User Interface: Logging in for Wired Web Scenario

Figure 28:
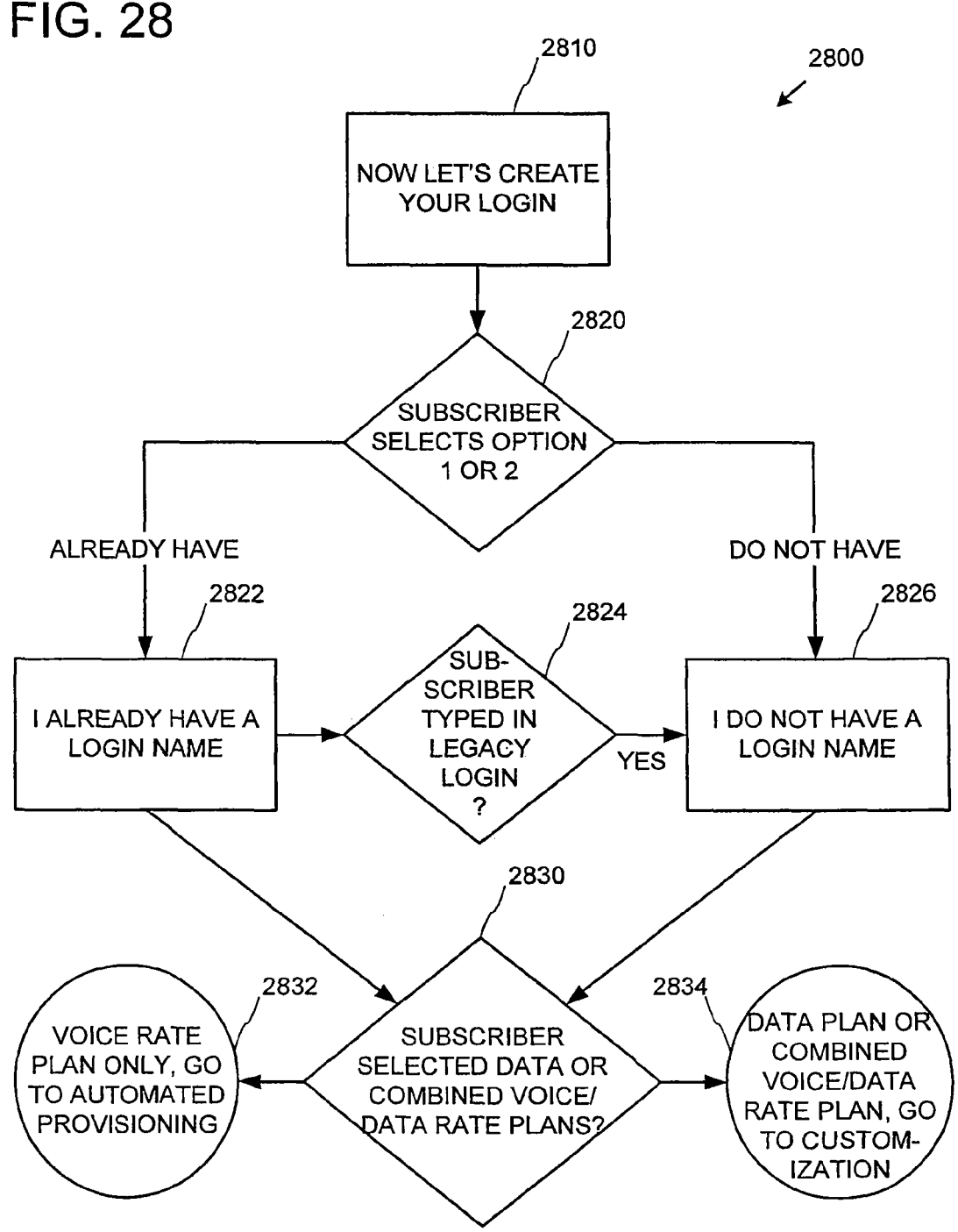
FIG. 28 is a flowchart showing an exemplary method for presenting user interfaces by which a subscriber can set up a log in in a wired web scenario.

FIG. 28 shows an exemplary method 2800 for presenting user interfaces by which a subscriber can set up a login. The method 2800 can be applied to a variety of scenarios (e.g., although shown for self-activation via the wired web, it can also be adapted for use in a device scenario). If desired, the method can accommodate legacy logins, if any. For example, a subscriber can use a legacy user name and password while migrating to a new login system.

At 2810, one or more user interfaces are presented by which a subscriber is informed that a login is being created. A subscriber can indicate whether or not a login name (e.g., 2.5G single sign on "SSO" login name) has already been acquired in the past. The subscriber selects an option at 2820. At 2822, if a subscriber already has a login name, they are prompted via one or more user interfaces to enter the user id and password. A family profile for the login name can be displayed, and the subscriber can be prompted to assign a name to the new profile they wish to add.

At 2824, it is determined whether the subscriber entered an inappropriate login (e.g., a legacy login). If so, processing continues at 2826. Similarly, if the subscriber indicated that a login was not already acquired, processing can continue at 2826.

At 2826, one or more user interfaces are presented by which the subscriber can create a new login name. For example, a user id, password, confirmation of password, challenge/response, and the like can be collected from the subscriber. A name for a profile can also be collected. If the subscriber already has a legacy login, it can be used for creating the new login.

At 2830, it is determined whether the subscriber selected only a voice plan. If so, processing continues at 2832. Otherwise, processing continues at 2834.

Example 37

Exemplary User Interface: Customization of Data Features for Wired Web Scenario

Figure 29:
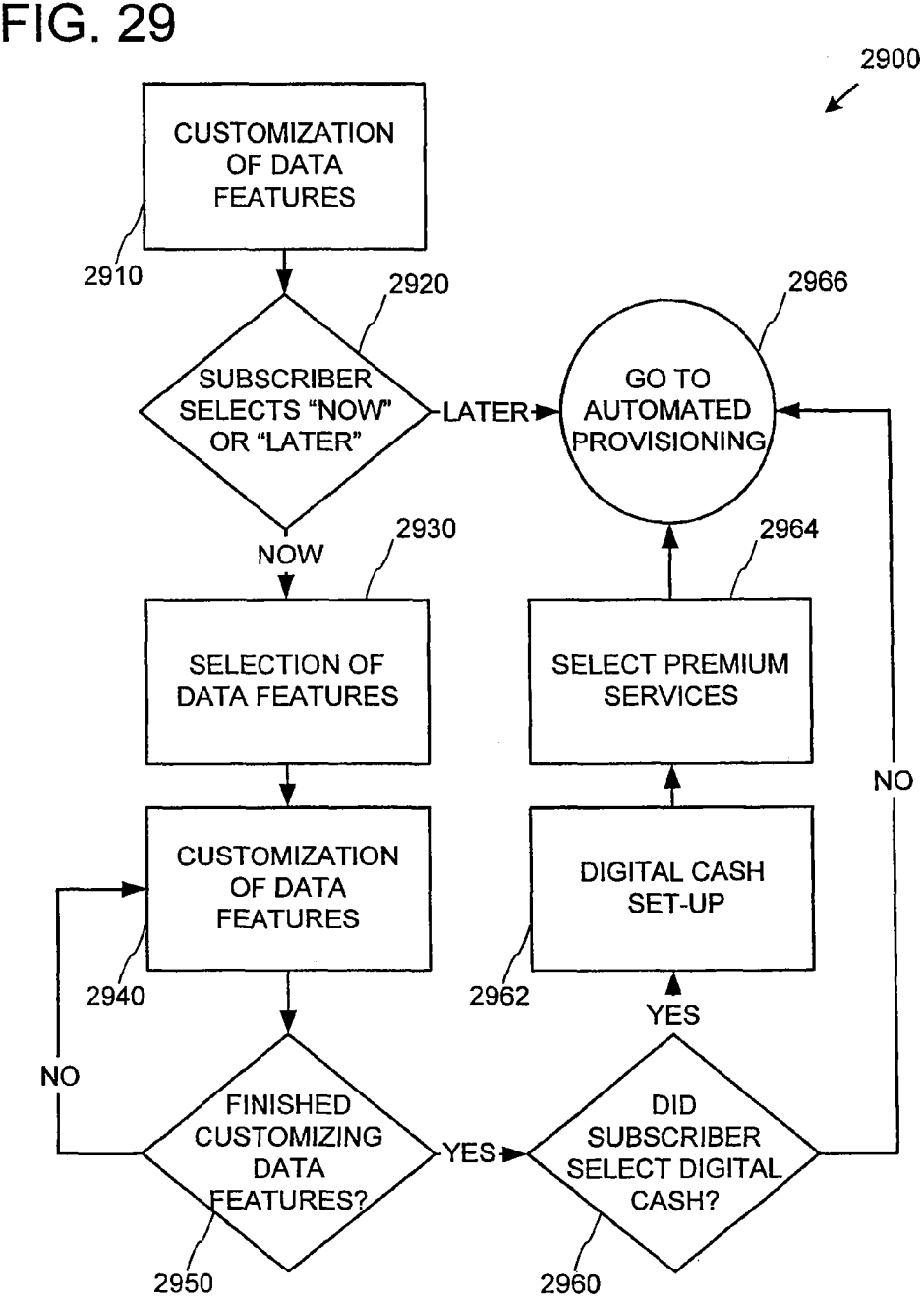
FIG. 29 is a flowchart showing an exemplary method for presenting user interfaces by which a subscriber can customize data features.

FIG. 29 shows an exemplary method 2900 for presenting user interfaces by which a subscriber can customize data features. The method 2900 can be applied to a variety of scenarios (e.g., self-activation via the wired web or via the mobile wireless device).

At 2910, one or more user interfaces are presented indicating that the subscriber can customize data features now or later. Processing can proceed from 2834.

At 2920, it is determined whether the subscriber selected now or later. If later, processing continues at 2966.

If the subscriber selected now, a list of features can be shown at 2930. The displayed features can be limited to those appropriate for the device kit or selected devices for SIM card. Customization of features can be achieved by display of one or more user interfaces at 2940. For example, pop up screens can be shown for features to allow customization.

At 2950, it is determined whether the subscriber has finished customizing features. If not, customization can continue at 2940.

If finished, it can be determined whether the subscriber selected digital cash at 2960. If so, digital cash can be set up at 2962. For example, a PIN code and PIN code reminder can be selected. Those premium services available via digital cash can then be shown via one or more user interfaces at 2964. For example, stock quotes, traffic warnings, news (e.g., sports), game of the day, and the like can be displayed for selection. Purchase of the services can be accomplished via user selection of the desired presented services. Upon completion, processing can continue at 2966.

Example 38

Exemplary User Interface: Automated Provisioning for Wired Web Scenario

Figure 30:
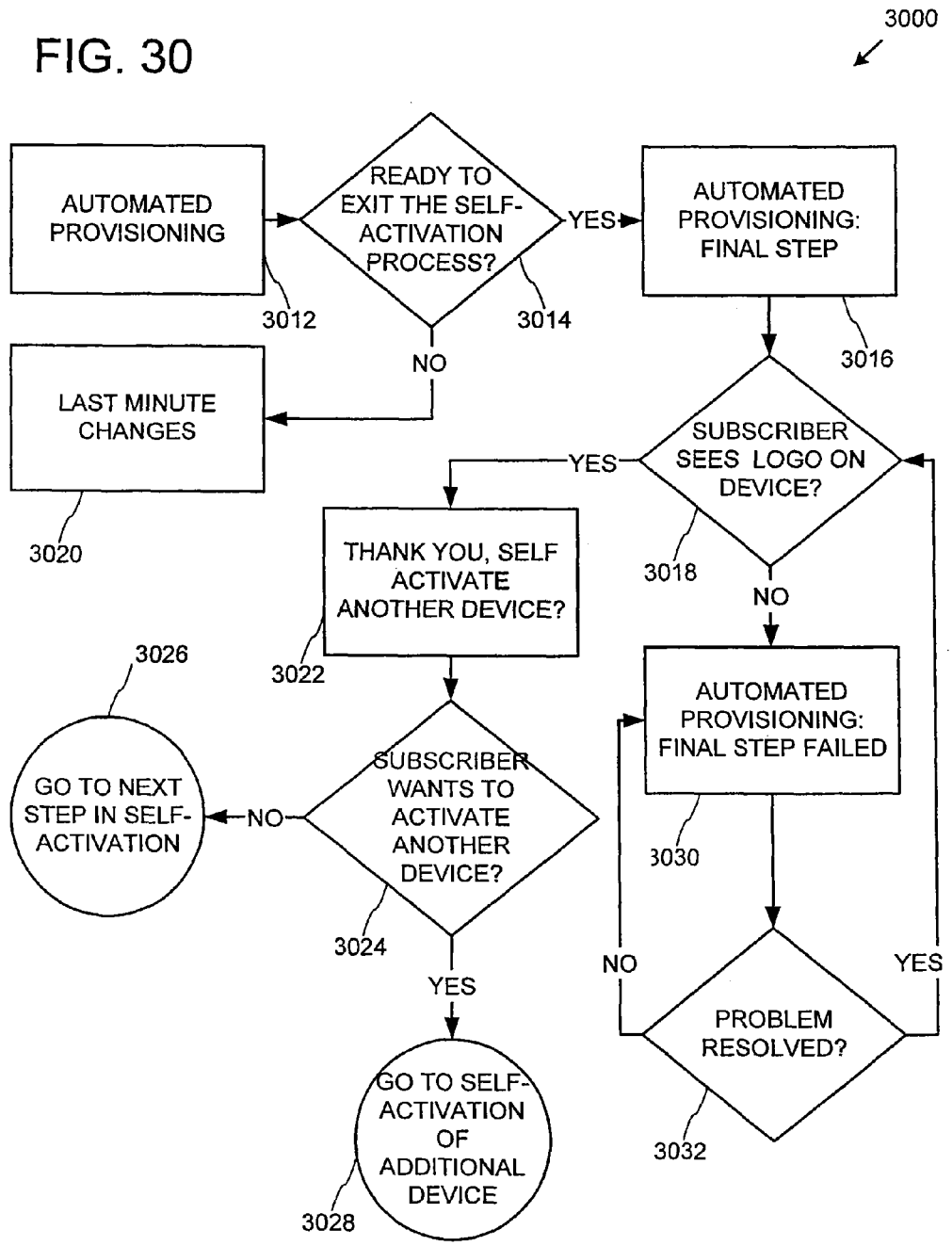
FIG. 30 is a flowchart showing an exemplary method for presenting user interfaces by which a subscriber can customize data complete additional provisioning in an activation via wired web scenario.

FIG. 30 shows an exemplary method 3000 for presenting user interfaces by which a subscriber can complete additional provisioning. The method 3000 can be applied to a variety of scenarios (e.g., although shown for self-activation via the wired web, the method can be adapted for activation via the mobile wireless device).

At 3012, one or more user interfaces can be displayed indicating that the account, rate plan, and additional services have been provisioned, and provisioning of a login (e.g., single sign on), data features, and digital cash can be completed. For example, processing can proceed from 2966 or 2832.

At 3014, it is determined (e.g., via activation of a user interface element) whether the subscriber is ready to exit the self-activation process. If not, last minute changes can be made at 3020.

If finished, one or more user interfaces for collecting confirmation that the logo and phone number appeared on the mobile wireless device can be displayed at 3016. At 3018, it is determined whether the subscriber confirmed completion of the final step.

If confirmed, the additional automated provisioning can be completed. Also, the subscriber can be, asked whether another device is to be activated at 3022. At 3024, it is determined whether the subscriber wishes to activate another device. If not, the next step can be performed at 3026.

If so, processing for activation of additional devices can proceed at 3028.

If not confirmed, an indication of failure of the final step can be shown at 3030. For example, options indicating how to resolve the problem can be displayed (e.g., calling a telephone number or entering a chatroom to speak with a customer care representative). At 3032, it is determined whether the problem was resolved. If not, processing can return to 3030. If so, the subscriber can again be asked to confirm at 3018.

Example 39

Figure 31:
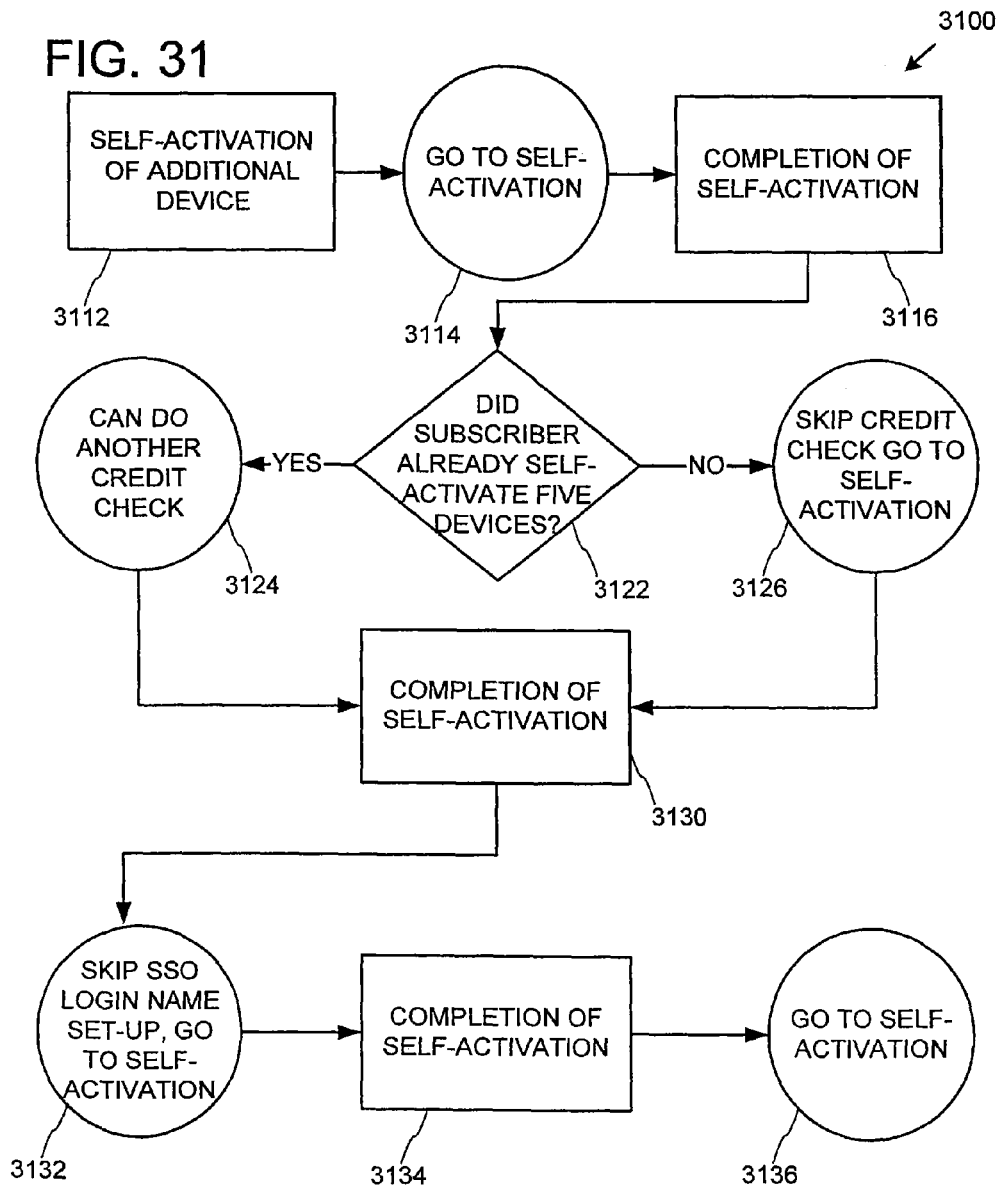
FIG. 31 is a flowchart showing an exemplary method for presenting user interfaces by which a subscriber can activate additional devices.

Exemplary User Interface: Self-Activation of Additional New Device for Wired Web Scenario FIG. 31 shows an exemplary method 3100 for presenting user interfaces by which a subscriber can activate additional devices. The method 3100 can be applied to a variety of scenarios (e.g., although shown for self-activation via the wired web, the method can be adapted for activation via the mobile wireless device).

At 3112, the customer has indicated that another device (e.g., from an indirect channel store) is to be activated. For example, processing can proceed from 3028. Processing can then proceed to self-activation at 3114 (e.g., via the method shown in FIG. 19).

Completion of self-activation (e.g., via device discovery process) is achieved at 3116. At 3122, it is determined whether the subscriber has already activated a certain number of devices (e.g., five). If so, another credit check can be performed at 3124 (e.g., via actions shown in FIG. 21). If not, another credit check need not be performed at 3126, and self-activation can be performed at 3130 (e.g., via the actions shown in FIG. 23). At 3132, the single sign on login name can be skipped. Completion of self-activation can be performed at 3134. Processing can proceed at 3136 (e.g., via the action shown in FIG. 30).

Example 40

Exemplary User Interface: Additional Links for Wired Web Scenario

Figure 32:
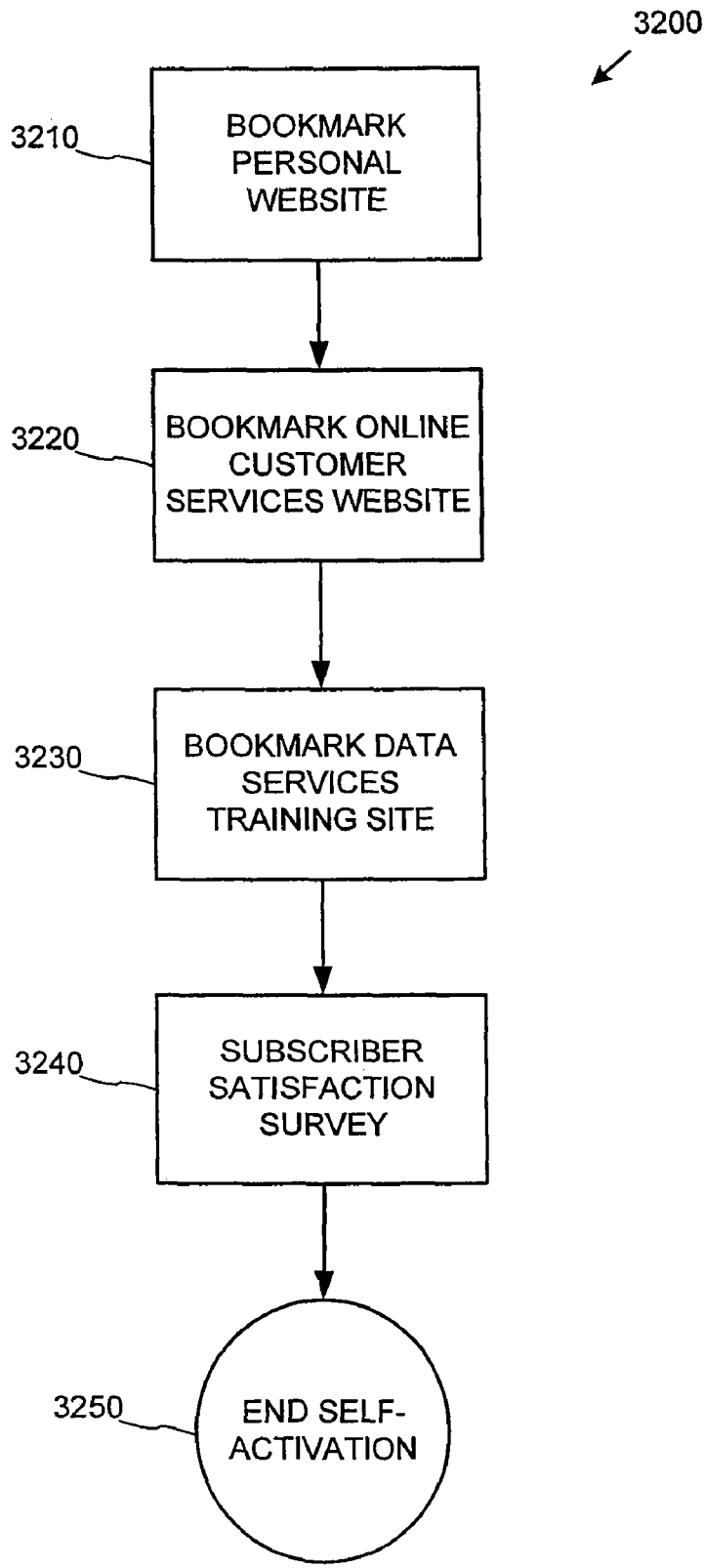
FIG. 32 is a flowchart showing an exemplary method for presenting user interfaces by which a subscriber can bookmark various sites.

FIG. 32 shows an exemplary method 3200 for presenting user interfaces by which a subscriber can bookmark various sites. The method 3200 can be applied to a variety of scenarios (e.g., although shown for self-activation via the wired web, it can be adapted to a scenario involving activation via the mobile wireless device).

At 3210, the subscriber is provided with one or more user interfaces by which a personal web site can be bookmarked, if desired. For example, upon entering the site and providing a user id and password, the subscriber can make post-activation changes to the account and services and view a bill.

At 3220, the subscriber is provided with one or more user interfaces by which a customer services web site can be bookmarked, if desired. For example, upon entering the site and providing a user id and password, a subscriber can make post activation changes to the account and services and view a bill.

At 3230, the subscriber is provided with one or more user interfaces by which a data services training site can be bookmarked, if desired. For example, a subscriber can navigate to the site to learn about the data services selected.

At 3240, the subscriber can be provided with one or more user interfaces by which a subscriber satisfaction survey can be completed. Incentives can be provided for completion of the survey. At 3250, the self-activation process has been completed.

Example 41

Exemplary User Interface: Logging in for Device Scenario

Figure 33:
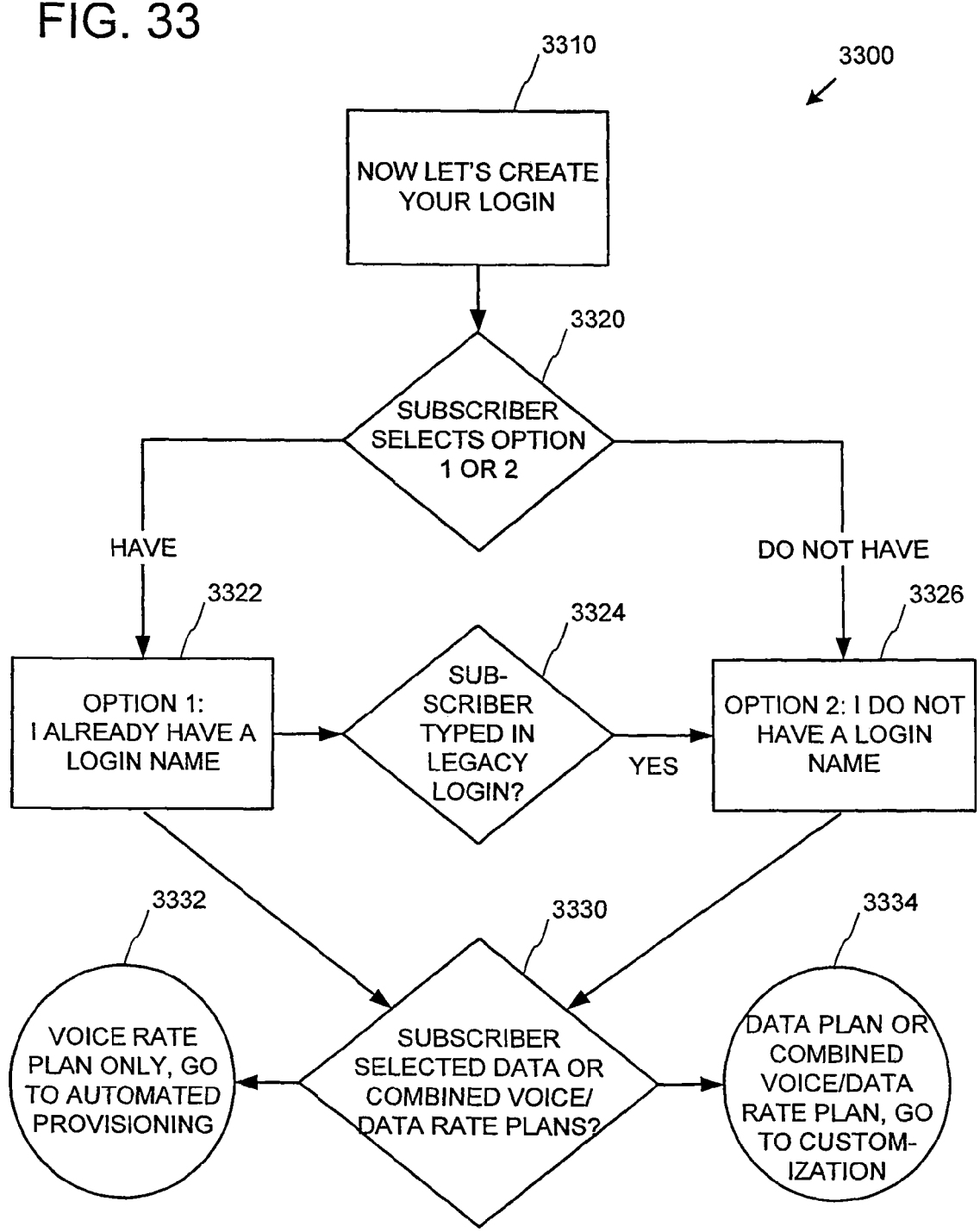
FIG. 33 is a flowchart showing an exemplary method for presenting user interfaces by which a subscriber can set up a log in in an activation by device scenario.

FIG. 33 shows an exemplary method 3300 for presenting user interfaces by which a subscriber can set up a login. The method 3300 can be applied to a variety of scenarios (e.g., although shown for self-activation via the device, it can also be adapted for use in a wired web scenario). If desired, the method can accommodate legacy logins, if any. For example, a subscriber can use a legacy user name and password while migrating to a new login system.

At 3310, one or more user interfaces are presented by which a subscriber is informed that a login is being created. A subscriber can indicate whether or not a login name (e.g., 2.5G single sign on "SSO" login name) has already been acquired in the past. The subscriber selects an option at 3320. At 3322, if a subscriber already has a login name, they are prompted via one or more user interfaces to enter the user id and password. A family profile for the login name can be displayed, and the subscriber can be prompted to assign a name to the new profile they wish to add.

At 3324, it is determined whether the subscriber entered an inappropriate login (e.g., a legacy login). If so, processing continues at 3326. Similarly, if the subscriber indicated that a login was not already acquired, processing can continue at 3326.

At 3326, one or more user interfaces are presented by which the subscriber can create a new login name. For example, a user id, password, confirmation of password, and challenge/response can be collected from the subscriber. A name for the profile can also be collected. Further, a zip code can be collected. If the subscriber already has a legacy login, it can be used for creating the new login.

At 3330, it is determined whether the subscriber selected only a voice plan. If so, processing continues at 3332. Otherwise, processing continues at 3334.

Example 42

Exemplary User Interface: Automated Provisioning for Device Scenario

Figure 34:
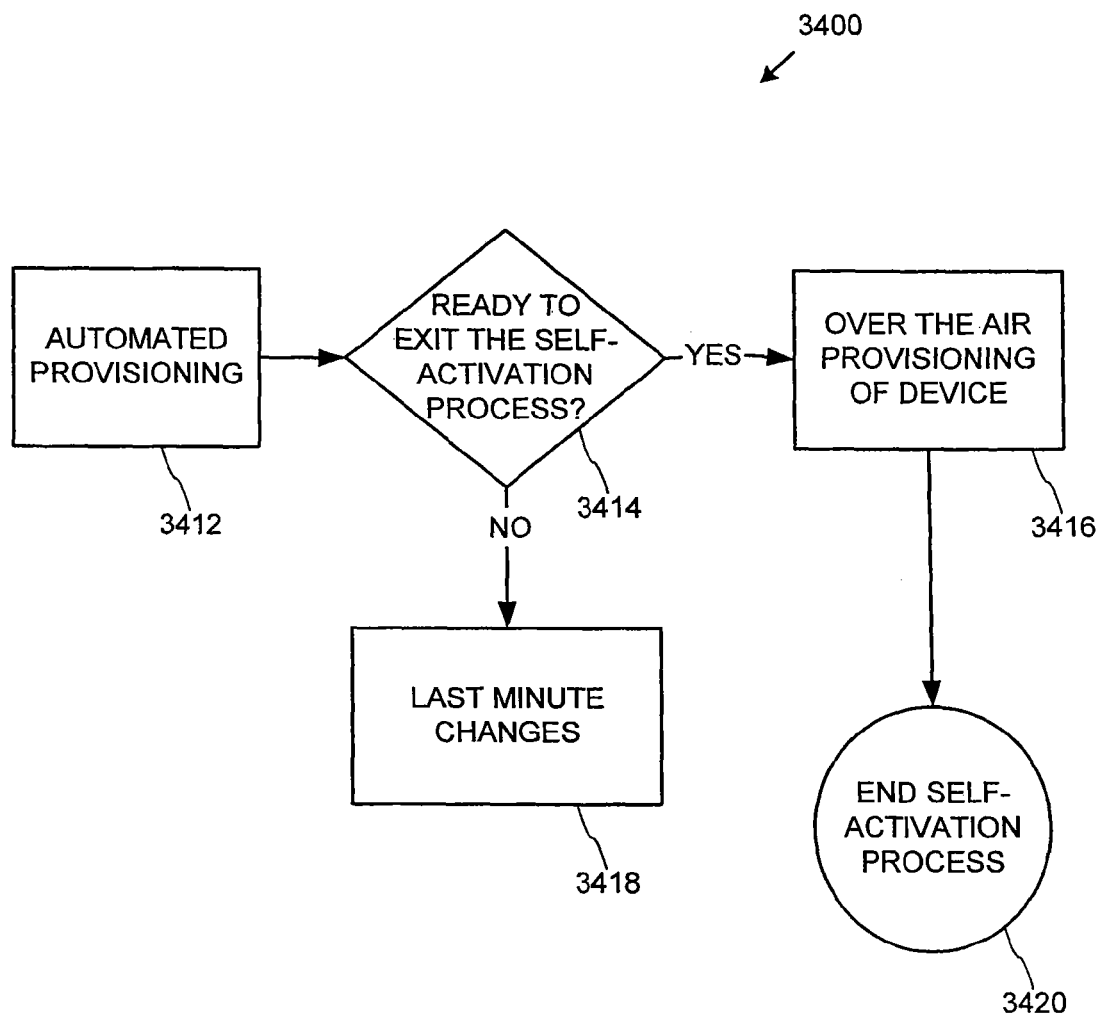
FIG. 34 is a flowchart showing an exemplary method for presenting user interfaces by which a subscriber can customize data complete additional provisioning in an activation by device scenario.

FIG. 34 shows an exemplary method 3400 for presenting user interfaces by which a subscriber can complete additional provisioning. The method 3400 can be applied to a variety of scenarios (e.g., although shown in an activation by device scenario, it can be adapted for use in a wired web scenario).

At 3412, one or more user interfaces can be displayed indicating that the account, rate plan, and additional services have been provisioned, and provisioning of a login (e.g., single sign on), data features, and digital cash can be completed. For example, processing can proceed from 2966 or 3332.

At 3414, it is determined (e.g., via activation of a user interface element) whether the subscriber is ready to exit the self-activation process. If not, last minute changes can be made at 3420.

If finished, the additional automated provisioning can be completed (e.g., the phone number can be sent to the device). A thank you message can be displayed, and the phone number and appropriate logo can be displayed on the device.

The self-activation process is completed at 3420.

Example 43

Exemplary Customer Service Methods

Even though the technologies described herein are typically aimed at reducing human involvement (e.g., other than the subscriber), at times it may be desirable to provide the subscriber with an opportunity to speak with or otherwise interact with a customer service representative. The following methods indicate possible ways of accommodating interaction between a subscriber (e.g., with an unactivated mobile wireless device) and a customer service representative.

Example 44

Exemplary Method: Customer Care Support

Figure 35:
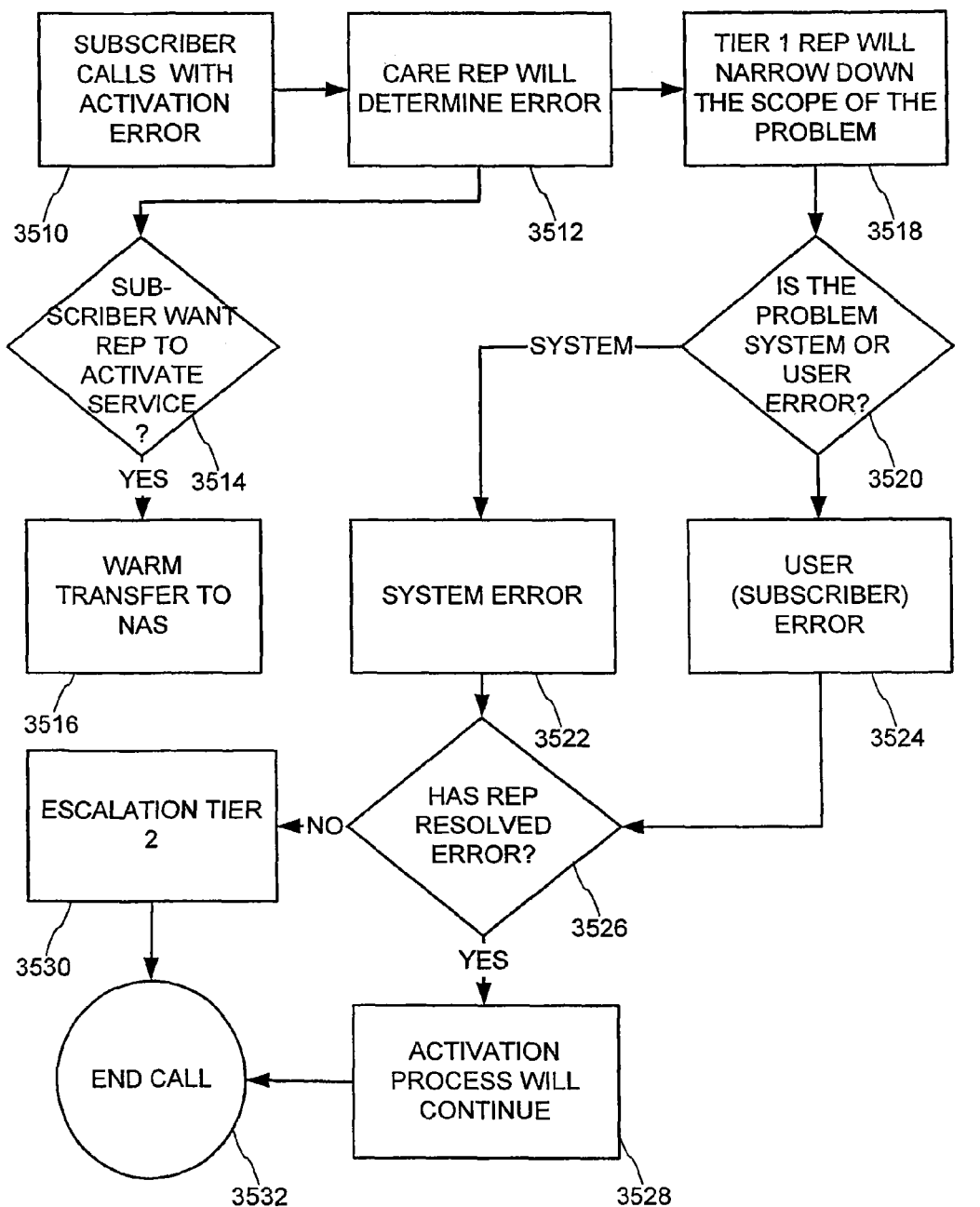
FIG. 35 is a flowchart showing an exemplary method for processing customer care support for a subscriber with an activation error.

FIG. 35 shows an exemplary method 3500 for processing customer care support for a subscriber with an activation error. The method 3500 can be applied to a variety of scenarios (e.g., self-activation via the wired web or via the mobile wireless device).

At 3510, the subscriber calls customer care with an activation error (e.g., screen errors or can't complete activation).

At 3512, the care representative determines the error (e.g., a system/user error or customer wants assistance with activation).

Figure 36:
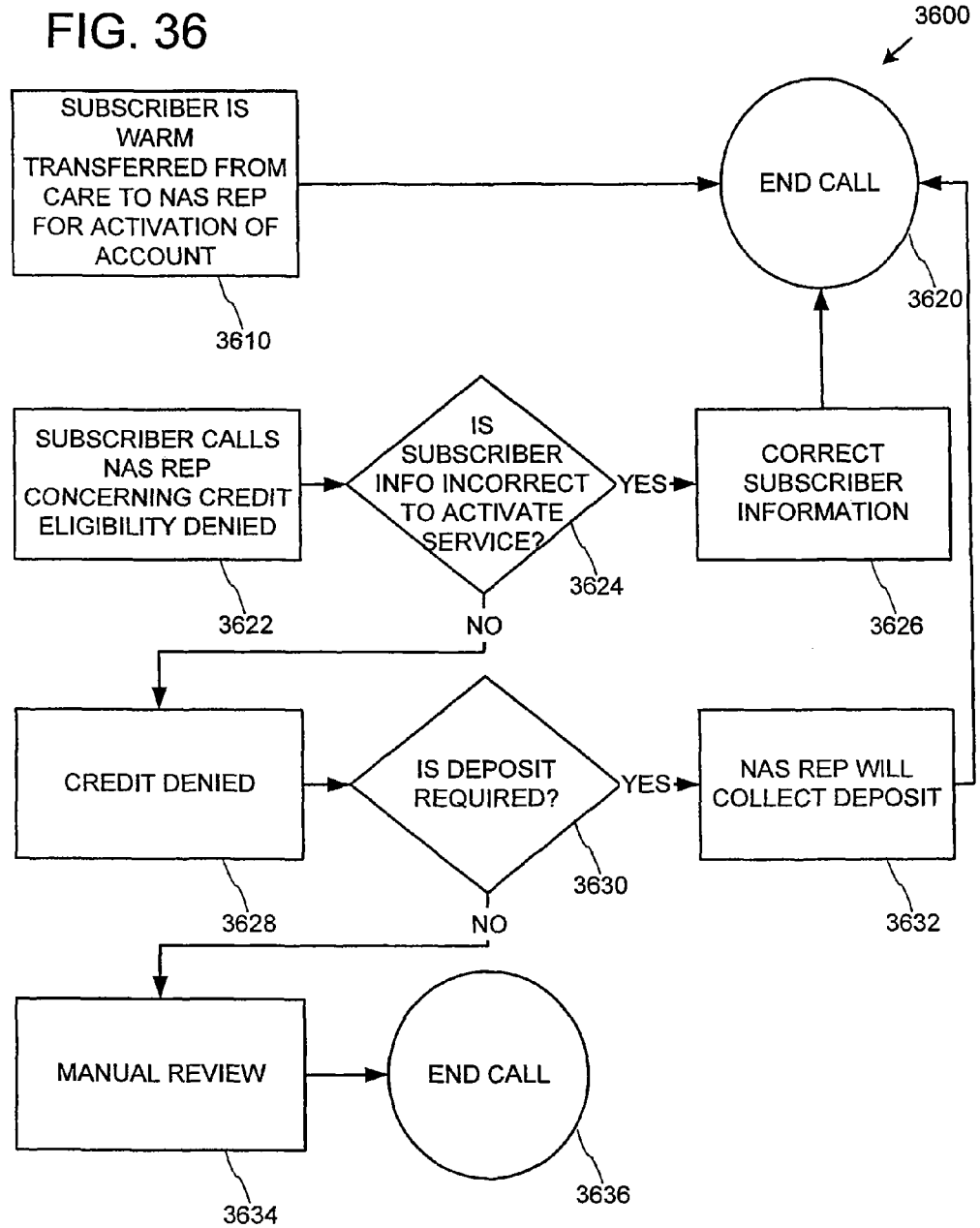
FIG. 36 is a flowchart showing an exemplary method for processing activation service support for a subscriber with an activation error.

At 3514, it is determined that the customer wants the representative to activate the service. Accordingly, at 3516, the call is transferred to a national activation services "NAS" representative. Processing can then continue as shown in FIG. 36.

At 3518, a tier 1 representative can narrow down the scope of the problem. For example, the representative can ask probing questions, use a troubleshooting tool, collect subscriber information, or check the automated activation and provisioning server to see how far the subscriber has progressed in the activation process. At 3520, it is determined whether the problem stems from system or user error.

At 3522, the problem stems from system error. The representative can use a troubleshooting tool or other tool in an attempt to resolve the system error.

At 3524, the problem stems from user error. The care representative can walk the customer through the proper screens to complete activation by using a troubleshooting tool.

At 3526, it is determined whether the representative has resolved the error. If so, the activation process can continue at 3528. For example, the customer can complete activation or the care representative can transfer the customer to activation services to complete activation (e.g., as shown in FIG. 36).

If the error has not been resolved, at 3530, the problem is escalated to tier 2. A tier 2 representative can open a trouble ticket and follow up (e.g., inform the subscriber to call back in 24 hours for resolution or contact the subscriber).

At 3532, the call is ended.

Example 45

Exemplary Method

National Activation Services ("NAS") Support

FIG. 36 shows an exemplary method 3600 for processing activation service support for a subscriber with an activation error. The method 3600 can be applied to a variety of scenarios (e.g., self-activation via the wired web or via the mobile wireless device).

At 3610, the subscriber has been transferred to a national activation services representative for activation of the subscriber's account. The representative can enter the subscriber's information into the automated activation and provisioning server to activate the account and provide the subscriber with the new phone number. The call is then ended at 3620.

Alternatively, at 3622, the subscriber has contacted the national activation services representative due to a denial of credit eligibility. The representative can collect the subscriber's name, address, and other (e.g., social security) information. At 3624, the provided information is compared against already used information to determine if the information was incorrect. If so, the information can be corrected at 3626, another credit check can be run, the proper information entered into the automated activation and provisioning server, and the representative can provide the subscriber with the phone number. Consequently, the call can end at 3620.

If the information was not incorrect, then credit continues to be denied at 3628. At 3630, it can be determined whether a deposit is required. If so, the representative can collect the deposit at 3632, enter information into the automated activation and provisioning server, and the representative can provide the subscriber with the new phone number. The call ends at 3620.

If a deposit is not required, at 3634, manual review can be performed. The representative can review the customer account and activate via the automated activation and provisioning server. The representative can provide the subscriber with the new phone number. The call ends at 3636.

FIG. 37 shows an exemplary method 3700 for processing activation service support for a subscriber with a credit denial.

At 3722, the subscriber has called support due to a denied credit card. The representative can review the information with the customer and request alternative payment. At 3724, it is determined whether the alternative payment is valid. If so, at 3726, a representative change the payment information (e.g., via the automated activation and provisioning server) to activate the account and provide the customer with the new phone number.

If not, at 3734, the representative informs the subscriber that the customer must return the phone (e.g., to place of purchase) and request a prepaid arrangement.

At 3736, the call ends.

Example 46

Exemplary Subscribers

Although the term "subscriber" is used herein, in some cases (e.g., in the case of an unactivated device), a subscription might not yet exist. Thus, subscribers include potential subscribers, or any other user of the system.

Example 47

Exemplary Post-Activation Functionality

Although some of the examples herein describe technologies associated with activation, any of the examples described herein can be applied to post-activation scenarios. For example, a subscriber may wish to add a service or change an existing service. An automated activation and provisioning server can receive communications from a mobile wireless device or a web browser system indicating subscriber choices for adding, deleting, or changing services. Appropriate actions related to provisioning can then be taken in response to receipt of the subscriber choices.

Example 48

Exemplary Automation

In any of the examples described herein, automation can be achieved without human intervention or in concert with human actions. In some cases, a user (e.g., operating a mobile wireless device or a web browser interface) may be involved. In such cases, responses to the user's actions can be achieved without further human intervention or in concert with human actions. For those functions achieved without human intervention, actions can be achieved via computer-executable instructions stored in one or more computer-readable media.

For example, the methods described in FIGS. 4, 7, 9, and 18-34 can be achieved via one or more computer-readable media comprising computer-executable instructions for performing the described actions.

Example 49

Exemplary Automated Activation and Provisioning Server

A general purposed computer system can be used for the automated activation and provisioning server. In some places herein, the server is referred to as a Siebel server because the server can be implemented via a computer system marketed by Siebel Systems, Inc. of San Mateo, Calif. However, many other computer systems can be used as an alternative.

Alternatives

In view of the many possible embodiments to which the principles of the invention may be applied, it should be recognized that the illustrated embodiments are examples of the invention, and should not be taken as a limitation on the scope of the invention. Rather, the scope of the invention includes what is covered by the following claims. I therefore claim as my invention all that comes within the scope and spirit of these claims.

I claim:

1. One or more computer-readable media comprising computer-executable instructions to achieve automated provisioning for a mobile wireless device in a wireless communications network support system, comprising:
   receiving an indication of one or more subscriber-desired services, wherein the one or more subscriber-desired services are selected by a subscriber via an electronic user interface;
   translating the indication of the one or more subscriber-desired services into associated provisioning directives; and
   sending the associated provisioning directives to provisioning elements within the wireless communications network support system to achieve provisioning for the one or more subscriber-desired services.

2. The one or more computer-readable media of claim 1 wherein the electronic user interface comprises a web browsing user interface.

3. The one or more computer-readable media of claim 1 wherein:
   a wireless communication network is supported by the wireless communications network support system; and
   the associated provisioning directives are sent to the provisioning elements behind the wireless communication network from a perspective of the mobile wireless device.

4. The one or more computer-readable media of claim 1 wherein the electronic user interface comprises a user interface presented by the mobile wireless device.

5. The one or more computer-readable media of claim 4 wherein the mobile wireless device is unactivated.

6. The one or more computer-readable media of claim 1 wherein the one or more subscriber-desired services comprise an enhanced service.

7. The one or more computer-readable media of claim 1 wherein the one or more subscriber-desired services comprise a ring tone feature.

8. The one or more computer-readable media of claim 1 wherein the one or more subscriber-desired services comprise enrolling in a transactional electronic payment system for premium services.

9. The one or more computer-readable media of claim 1 wherein the one or more subscriber-desired services comprise subscribing to an online office.

10. The one or more computer-readable media of claim 1 wherein the one or more subscriber-desired services comprise subscribing to an image center.

11. The one or more computer-readable media of claim 1 wherein the one or more subscriber-desired services comprise a game functionality.

12. The one or more computer-readable media of claim 1 wherein the one or more subscriber-desired services comprise a text messaging functionality.

13. The one or more computer-readable media of claim 1 wherein the one or more subscriber-desired services comprise a unified messaging functionality.

14. The one or more computer-readable media of claim 1 wherein the one or more subscriber-desired services comprise subscribing to a subscription-based assistance program.

15. The one or more computer-readable media of claim 1 wherein the one or more subscriber-desired services comprise purchasing an equipment insurance.

16. The one or more computer-readable media of claim 1 wherein the one or more subscriber-desired services comprise enrolling in a mobile to mobile minutes plan.

17. The one or more computer-readable media of claim 1 wherein the one or more subscriber-desired services comprise a voice activated dialing.

18. The one or more computer-readable media of claim 1 wherein the one or more subscriber-desired services comprises purchasing accessories.

19. A method of automated provisioning for a mobile wireless device in a wireless communications network support system, the method comprising:
   receiving an indication of one or more subscriber-desired services, wherein the one or more subscriber-desired services are selected by the a subscriber via an electronic user interface;
   translating the indication of the one or more subscriber-desired services into associated provisioning directives; and
   sending the associated provisioning directives to provisioning elements within the wireless communications network support system to achieve provisioning for the one or more subscriber-desired services.

20. An automated activation and provisioning server computer system for achieving automated activation and provisioning in a wireless communications network support system, the server computer system comprising:
   a translation engine operable to translate an indication of one or more subscriber-desired services into associated provisioning directives; and
   a real time provisioning engine operable to send the associated, provisioning directives within the wireless communications network support system, the real time provisioning engine being operable to achieve automated provisioning for the one or more subscriber-desired services.

* * * * *